US012675922B2

(12) United States Patent　　(10) Patent No.:　US 12,675,922 B2
Moraleda et al.　　　　　　　　(45) Date of Patent:　　　Jul. 7, 2026

(54) SYSTEMS AND METHODS FOR TRANSFERRING MARKINGS

(71) Applicant: Genomic Health, Inc., Redwood City, CA (US)

(72) Inventors: Gabriel Jesus Samuel Perlas Moraleda, Santa Clara, CA (US); Amy Lee Hsieh Yuan, Saratoga, CA (US); Hubert Yeung, Millbrae, CA (US); Chun Wai Lee, El Cerrito, CA (US)

(73) Assignee: Genomic Health, Inc., Madison, WI (US)

( * ) Notice: Subject to any disclaimer, the term of this patent is extended or adjusted under 35 U.S.C. 154(b) by 106 days.

(21) Appl. No.: 18/290,902

(22) PCT Filed: Jul. 22, 2022

(86) PCT No.: PCT/US2022/038002
§ 371 (c)(1),
(2) Date: Jan. 22, 2024

(87) PCT Pub. No.: WO2023/004108
PCT Pub. Date: Jan. 26, 2023

(65) Prior Publication Data
US 2024/0331227 A1　　Oct. 3, 2024

Related U.S. Application Data

(60) Provisional application No. 63/225,079, filed on Jul. 23, 2021.

(51) Int. Cl.
G06T 11/23　　　　(2026.01)
G06T 3/14　　　　　(2024.01)
(Continued)

(52) U.S. Cl.
CPC ................ G06T 11/23 (2026.01); G06T 3/14 (2024.01); G06T 3/20 (2013.01); G06T 3/40 (2013.01);
(Continued)

(58) Field of Classification Search
CPC . G06T 11/203; G06T 3/14; G06T 3/20; G06T 3/40; G06T 3/60; G06T 7/13;
(Continued)

(56) References Cited

U.S. PATENT DOCUMENTS 7,369,304 B2　　5/2008　Maenle et al.
8,787,651 B2　　7/2014　Potts et al.
(Continued)

FOREIGN PATENT DOCUMENTS

JP　　　　2020502540 A　　　1/2020
WO　　WO-2014140070 A2　　9/2014
(Continued)

OTHER PUBLICATIONS

Supplementary European Search Report for European Application No. 22846664.5, mailed May 8, 2025, 14 Pages.
(Continued)

*Primary Examiner* — Michael Le
(74) *Attorney, Agent, or Firm* — Casimir Jones, S.C.; Rikki A. Hullinger

(57) ABSTRACT

The technologies disclosed herein relate to a system and method for transferring markings. The system can include an imaging device for imaging a stained slide and an unstained slide, a display for displaying one or more images of the stained slide and the unstained slide. In various embodiments, the system can include a mechanical stage, such as a scaffold, for positioning or orienting the stained slide with respect to the unstained slide. In various embodiments, the system can be coupled with a first application for aligning
(Continued)

100
120　　140　　160　　180 the images to enable digital marking of the unstained slide and a second application for digitally marking one or more features and transferring the digital markings into coordinates to be used for further processing, such as for dissection.

19 Claims, 7 Drawing Sheets

(51) Int. Cl.

| | |
|---|---|
| *G06T 3/20* | (2006.01) |
| *G06T 3/40* | (2024.01) |
| *G06T 3/60* | (2024.01) |
| *G06T 7/13* | (2017.01) |

(52) U.S. Cl.
CPC .................. *G06T 3/60* (2013.01); *G06T 7/13* (2017.01); *G06T 2200/24* (2013.01); *G06T 2207/10056* (2013.01); *G06T 2207/20092* (2013.01); *G06T 2207/30024* (2013.01); *G06T 2210/41* (2013.01); *G06T 2210/62* (2013.01)

(58) Field of Classification Search
CPC ....... G06T 2200/24; G06T 2207/10056; G06T 2207/20092; G06T 2207/30024; G06T 2210/41; G06T 2210/62; G06T 2211/452; G06T 2211/456; G06T 2211/461; G06T 7/0012; G06T 11/008; G06F 3/04842; G06F 3/04845; G06V 10/242; G06V 10/245; G06V 20/698; G16H 30/40; G16H 10/40
See application file for complete search history.

(56) References Cited

U.S. PATENT DOCUMENTS

| | | | |
|---|---|---|---|
| 8,995,733 | B2 | 3/2015 | Van Dijk et al. |
| 9,547,898 | B2 | 1/2017 | Hall et al. |
| 9,607,379 | B1 | 3/2017 | Potts et al. |
| 9,804,144 | B2 | 10/2017 | Schlaudraff et al. |
| 9,984,457 | B2 | 5/2018 | Hall et al. |
| 9,990,723 | B2 | 6/2018 | Van Leeuwen et al. |
| 10,650,221 | B2 | 5/2020 | Chukka et al. |
| 10,684,461 | B2 | 6/2020 | Boamfa et al. |
| 10,867,443 | B2 | 12/2020 | Vink et al. |
| 10,871,425 | B2 * | 12/2020 | Barnes .................. G01N 1/286 |
| 11,125,660 | B2 | 9/2021 | Barnes et al. |
| 11,181,449 | B2 | 11/2021 | Barnes et al. |
| 11,768,136 | B2 | 9/2023 | Barnes et al. |
| 11,860,072 | B2 | 1/2024 | Barnes et al. |
| 2011/0006220 | A1 * | 1/2011 | Kishima ............... G06T 7/0012 |
| | | | 250/459.1 |
| 2012/0076390 | A1 | 3/2012 | Potts et al. |
| 2012/0327211 | A1 * | 12/2012 | Yamamoto ............ G16H 10/40 |
| | | | 382/133 |
| 2013/0155058 | A1 * | 6/2013 | Golparvar-Fard ........................... |
| | | | G06Q 10/06311 |
| | | | 345/419 |
| 2017/0328817 | A1 * | 11/2017 | Barnes .................. G01N 1/286 |
| 2018/0108163 | A1 * | 4/2018 | Remiszewski .......... G06T 11/60 |
| 2018/0128714 | A1 * | 5/2018 | Adey ........................ G01N 1/06 |
| 2018/0225872 | A1 * | 8/2018 | Vink ..................... G06T 7/0012 |
| 2019/0317310 | A1 * | 10/2019 | Vink ....................... G02B 21/34 |
| 2019/0390252 | A1 * | 12/2019 | Yeung .................. C12Q 1/6806 |
| 2021/0110536 | A1 * | 4/2021 | Akazawa ................ G06T 7/194 |
| 2021/0262907 | A1 * | 8/2021 | Mitra ............... G01N 35/00732 |
| 2023/0030424 | A1 * | 2/2023 | Ozcan .................. G06V 20/698 |
| 2023/0393036 | A1 | 12/2023 | Barnes et al. |

FOREIGN PATENT DOCUMENTS

| | | |
|---|---|---|
| WO | WO-2016120433 A1 | 8/2016 |
| WO | WO 2021/001564 | 1/2021 |

OTHER PUBLICATIONS

International Search Report and Written Opinion for PCT/US22/38002. Mailed Feb. 2, 2023. 16 pages.

* cited by examiner

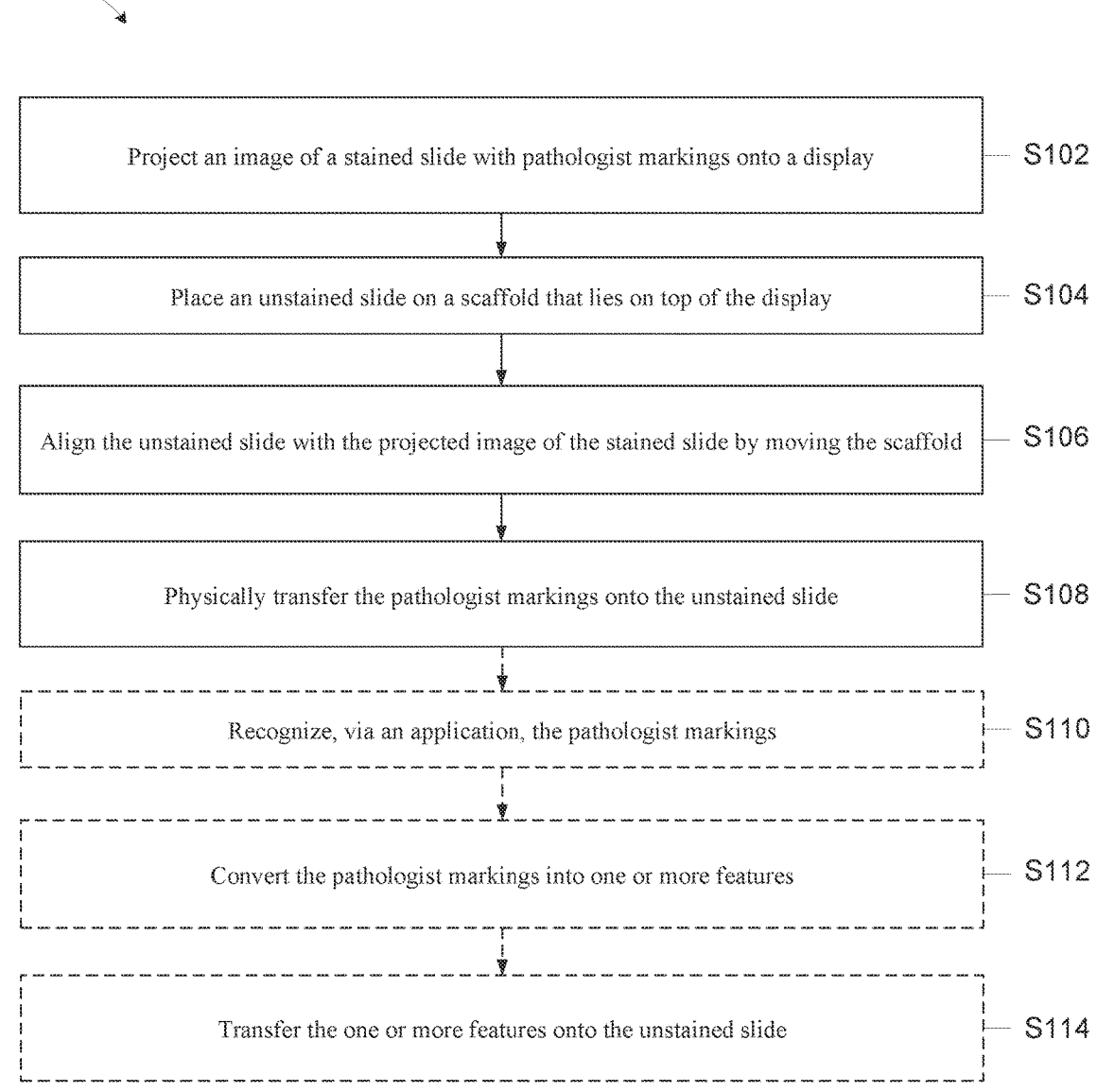

S100

| | |
|---|---|
| Project an image of a stained slide with pathologist markings onto a display | S102 |
| Place an unstained slide on a scaffold that lies on top of the display | S104 |
| Align the unstained slide with the projected image of the stained slide by moving the scaffold | S106 |
| Physically transfer the pathologist markings onto the unstained slide | S108 |
| Recognize, via an application, the pathologist markings | S110 |
| Convert the pathologist markings into one or more features | S112 |
| Transfer the one or more features onto the unstained slide | S114 |

| Obtain an image of a stained slide under an imager | — S202 |

| Project the image of the stained slide onto a display | — S204 |

| Mark the image of the stained slide | — S206 |

| Transfer the markings of the stained slide to an unstained slide | — S208 |

| Capture a marked unstained slide with transferred markings | — S210 |

1

SYSTEMS AND METHODS FOR TRANSFERRING MARKINGS

STATEMENT REGARDING RELATED APPLICATIONS

This application claims priority to U.S. Provisional Patent Application No. 63/225,079, filed Jul. 23, 2021, the entire contents of which are incorporated herein by reference for all purposes.

FIELD

The present disclosure generally relates to fields of histology and/or pathobiology. More specifically, the present disclosure relates to making and transferring of pathologist markings for automatic downstream analysis or processing of a biological specimen.

BACKGROUND

A variety of methods have been suggested to resolve cumbersome nature of scraping procedures for preparation and/or processing of histological samples for downstream analysis or processing. Current tissue dissection processes are completely manual or completely automated. For completely manual processes, a razor blade is used to scrape and directly collect a region of interest (ROI) or "S" areas from a substrate, such as a glass slide. For example, conventional workflows for substrate submissions include an entirely manual process where a user manually transfers the pathologist area of interest markings on a stained slide to unstained slides using a standard off-the-shelf marking pen. The user then uses a razor blade or equivalent to scrape off the area of interest (e.g. "S") on the marked unstained substrate and collect into a container.

For completely automated processes, an operator inserts a sample into a machine and the "S" areas are automatically retrieved. However, the rate of successfully obtaining the desired "S" areas is not close to 100%, and thus, it is not satisfactory. A completely manual process completely relies on operator hand/eye coordination, but it can achieve a success rate closer to 100%, and therefore the consistency and accuracy of the tissue scraping can be drastically improved. However, completely manual processes also introduce ergonomics/safety issues because the constant force being applied to the glass surface may cause laceration and ergonomic issues (e.g., carpel tunnel) with the operator.

Current implementations of physical and digital pathology have improved many areas of histology/pathology workflows. However, there are still some important areas of unmet needs. One unmet need is that some substrate submissions cannot be processed digitally using the commercial Digital Pathology Systems. A substantial number of cases still require manual glass workflow processing. Therefore, there exists a need for a way to convert this process to achieve full digital workflow.

SUMMARY

In accordance with various embodiments disclosed herein, a system for transferring pathologist markings is provided. The system includes an imaging device configured for imaging a stained slide or an unstained slide; a display for displaying one or more images of the stained slide or the unstained slide; a mechanical stage/scaffold for positioning or orienting the stained slide with respect to the unstained slide to enable physical marking of the unstained slide; and an application used to digitally draw one or more features based on the physical marking and transfer the physical marking into coordinates to be used for further processing.

In accordance with various embodiments disclosed herein, a method for transferring markings is provided. The method includes projecting an image of a stained slide with pathologist markings onto a display; placing an unstained slide on a scaffold that lies on top of the display; aligning the unstained slide with the projected image of the stained slide by moving the scaffold; and physically transferring the pathologist markings onto the unstained slide.

In accordance with various embodiments disclosed herein, a system for transferring pathologist markings is provided. The system includes an imaging device configured for imaging a stained slide and an unstained slide; a display for displaying one or more images of the stained slide and the unstained slide; a first application used in aligning the one or more images of the stained slide or unstained slide; and a second application used in digitally marking one or more features and transferring the digital marking of the one or more features into coordinates.

In accordance with various embodiments disclosed herein, a method for digitally transferring markings is provided. The method includes obtaining an image of a stained slide under an imager; projecting the image of the stained slide onto a display; marking the image of the stained slide; transferring the markings of the stained slide to an unstained slide; and capturing a marked unstained slide with transferred markings.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 4 is a flowchart for an example method for transferring markings, according to various embodiments;

DETAILED DESCRIPTION

Figure 1:
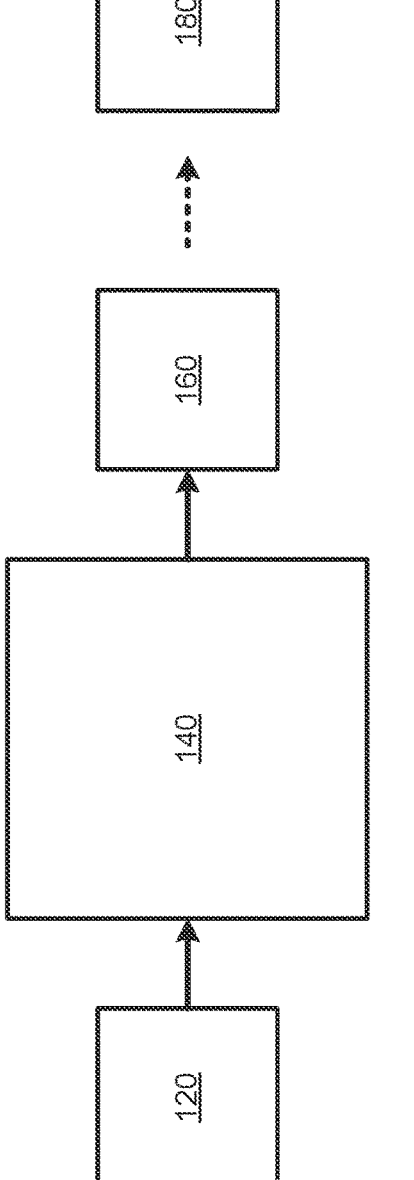
FIG. 1 is a schematic illustration of an example system for transferring markings, according to various embodiments.

The present disclosure, and corresponding embodiments, solve the known problem of processing biological specimens via a full digital workflow using the commercial Digital Pathology Systems. The disclosed systems, tools, methodologies, and/or approaches are suitable for use in transferring pathologist markings for histology and/or pathobiology, while providing improved reliability and consistency in making, converting, and/or transferring markings for use in automatic downstream analysis or the processing of biological specimens.

It is to be understood that the following disclosure provides many different embodiments, or examples, for implementing different features of the disclosure. Specific embodiments or examples of components and arrangements are described below to simplify the present disclosure. These are, of course, merely examples and are not intended to be limiting. For example, dimensions of elements are not limited to the disclosed range or values but may depend upon process conditions and/or desired properties of the device. Moreover, the formation of a first feature over or on a second feature in the description that follows may include embodiments in which the first and second features are formed in direct contact and may also include embodiments in which additional features may be formed interposing the first and second features, such that the first and second features may not be in direct contact. Various features may be arbitrarily drawn in different scales for simplicity and clarity.

Some of the terms used herein are defined as described in this section. Other terms are defined or exemplified elsewhere in the disclosure. Unless defined otherwise, technical and scientific terms used herein have the same meaning as commonly understood by one of ordinary skill in the art to which this invention belongs.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly. In addition, the term "made of" may mean either "comprising" or "consisting of."

In this application, the use of "or" means "and/or" unless stated otherwise. In the context of a multiple dependent claim, the use of "or" refers back to more than one preceding independent or dependent claim in the alternative only.

The word "about" means a range of plus or minus 10% of that value, e.g., "about 5" means 4.5 to 5.5, "about 100" means 90 to 100, etc., unless the context of the disclosure indicates otherwise, or is inconsistent with such an interpretation. For example, in a list of numerical values such as "about 49, about 50, about 55", "about 50" means a range extending to less than half the interval(s) between the preceding and subsequent values, e.g., more than 49.5 to less than 52.5. Furthermore, the phrases "less than about" a value or "greater than about" a value should be understood in view of the definition of the term "about" provided herein.

Where a range of values is provided in this disclosure, it is intended that each intervening value between the upper and lower limit of that range and any other stated or intervening value in that stated range is encompassed within the disclosure. For example, if a range of 1 μm to 8 μm is stated, it is intended that 2 μm, 3 μm, 4 μm, 5 μm, 6 μm, and 7 μm are also disclosed.

As used herein, the term "plurality" can be 2, 3, 4, 5, 6, 7, 8, 9, 10, or more.

As used herein, the term "detecting," refers to the process of determining a value or set of values associated with a sample by measurement of one or more parameters in a sample and may further comprise comparing a test sample against reference sample. In accordance with the present disclosure, the detection of tumors includes identification, assaying, measuring and/or quantifying one or more markers.

The term "likelihood," as used herein, generally refers to a probability, a relative probability, a presence or an absence, or a degree.

As used herein, the terms "comprise" (or variations thereof), "contain" (or variations thereof), "have" (or variations thereof), or "include" (or variations thereof), are not intended to be limiting, are inclusive or open-ended and do not exclude additional, unrecited additives, components, integers, elements or method steps. For example, a process, method, system, composition, kit, or apparatus that comprises a list of features is not necessarily limited only to those features but may include other features not expressly listed or inherent to such process, method, system, composition, kit, or apparatus.

The term "sample" as used herein refers to a composition that is obtained or derived from a subject of interest that contains a cellular and/or other molecular entity that is to be characterized and/or identified, for example based on physical, biochemical, chemical and/or physiological characteristics. Preferably, the sample is a "biological sample," which means a sample that is derived from a living entity, e.g., cells, tissues, organs and the like. In some embodiments, the source of the tissue sample may be blood or any blood constituents; bodily fluids; solid tissue as from a fresh, frozen and/or preserved organ or tissue sample or biopsy or aspirate; and cells from any time in gestation or development of the subject or plasma. Samples include, but not limited to, primary or cultured cells or cell lines, cell supernatants, cell lysates, platelets, serum, plasma, fluids (e.g., lymph, amniotic, milk, whole blood, urine, CSF, saliva, sputum, tears, perspiration, mucus, tumor lysates, and cell culture medium), homogenized tissue, tumor tissue, and cellular extracts. Samples further include biological samples that have been manipulated, e.g., via treatment with reagents, solubilized, or enriched for certain components, such as proteins or nucleic acids, or embedded in a semi-solid or solid matrix for sectioning purposes, e.g., a thin slice of tissue or cells in a histological sample. Samples may contain environmental components, such as, e.g., water, soil, mud, air, resins, minerals, etc. Preferably, the biological sample contains DNA (e.g., gDNA, mtDNA), RNA (e.g., mRNA, tRNA), protein, or combinations thereof, obtained from a subject (e.g., human or other mammalian subjects). In some embodiments, the term "sample" refers to cells, tissue, specimens, tissue samples, FFPE tissue, blood, or other biological materials affixed using standard molecular biology methods.

As used herein, the term "cell" is used interchangeably with the term "biological cell." Non-limiting examples of biological cells include eukaryotic cells, plant cells, animal cells, such as mammalian cells, reptilian cells, avian cells, fish cells, or the like, prokaryotic cells, bacterial cells, fungal cells, protozoan cells, or the like, cells dissociated from a tissue, such as muscle, cartilage, fat, skin, liver, lung, neural tissue, and the like, immunological cells, such as T cells, B cells, natural killer cells, macrophages, and the like, embryos (e.g., zygotes), oocytes, ova, sperm cells, hybridomas, cultured cells, cells from a cell line, cancer cells, infected cells, transfected and/or transformed cells, reporter cells, and the like. A mammalian cell can be, for example, from a human, a mouse, a rat, a horse, a goat, a sheep, a cow, a primate, or the like.

As used herein, the term "tumor" includes any cell or tissue that may have undergone transformation at the genetic, cellular, or physiological level compared to a normal or wild-type cell. The term usually denotes neoplastic growth which may be benign (e.g., a tumor which does not form metastases and destroy adjacent normal tissue) or malignant/cancer (e.g., a tumor that invades surrounding tissues, and is usually capable of producing metastases, may recur after attempted removal, and is likely to cause death of the host unless adequately treated). See Steadman's Medical Dictionary, 28$^{th}$ Ed Williams & Wilkins, Baltimore, MD (2005).

The term "cancer" refers to abnormal cell growth, particularly cancers and carcinomas, sarcomas, adenocarcinomas, lymphomas, leukemia, solid and lymphoid cancers, etc. which are malignant in nature. Examples of different types of cancer include, but are not limited to, lung cancer, pancreatic cancer, breast cancer, gastric cancer, bladder cancer, oral cancer, ovarian cancer, thyroid cancer, prostate cancer, uterine cancer, testicular cancer, neuroblastoma, squamous cell carcinoma of the head, neck, cervix and vagina, multiple myeloma, soft tissue and osteogenic sarcoma, colorectal cancer, liver cancer, renal cancer (e.g., RCC), pleural cancer, cervical cancer, anal cancer, bile duct cancer, gastrointestinal carcinoid tumors, esophageal cancer, gall bladder cancer, small intestine cancer, cancer of the central nervous system, skin cancer, choriocarcinoma; osteogenic sarcoma, fibrosarcoma, glioma, melanoma, etc.

The term "normal" as used in the context of "normal cell," is meant to refer to a cell of an untransformed phenotype or exhibiting a morphology of a non-transformed cell of the tissue type being examined (e.g., PBMC). In some embodiments, "normal sample" as used herein includes non-tumor sample, e.g., saliva sample, skin sample, hair sample or the like. It should be noted that the methods of the disclosure may be implemented without the use of normal samples.

The term "abnormal," as used herein, generally refers to a state of a biological system that deviates in some degree from normal (e.g., wild-type). Abnormal states can occur at the physiological or molecular level. Representative examples include, e.g., physiological state (disease, pathology) or a genetic aberration (mutation, single nucleotide variant, copy number variant, gene fusion, indel, etc.). A disease state can be cancer or pre-cancer. An abnormal biological state may be associated with a degree of abnormality (e.g., a quantitative measure indicating a distance away from normal state).

A "formalin-fixed, wax-embedded" or a "formalin-fixed, paraffin-embedded" or "FFPE" tissue sample herein is broadly construed to refer to a sample that has been fixed with formalin or an equivalent substance and embedded in wax, such as paraffin wax or an equivalent substance. FFPE tissue herein may be from any human, animal or plant source. An alternative to FFPE is a cryopreserved specimen embedded in optimal cutting temperature compound (OCT).

A "slide" herein may be any type of surface capable of holding a sample or specimen, for instance FFPE tissue, for analysis and may be made out of any suitable materials.

A "region of interest" or "ROI" herein refers to a portion of a sample on a substrate that a user may wish to analyze, such as to evaluate alterations in the sequence, structure, or expression level of genes. Samples on a substrate may be comprised of all ROI, no ROI, one ROI, or more than one ROI. An ROI is also referred to as "S" sample or area herein. A "region of non-interest" or "RONI" sample on a substrate is referred to herein as "X" sample or area. Macrodissection techniques, which involve histological sectioning of not only the regions of interest but also surrounding tissues of the organ under investigation, have increasingly been deployed in many pathological investigations, such as tumor typing, diagnosis of inflammatory diseases, and determination of degenerative diseases. In macrodissection, patient tissue of interest ("S" area) are collected from histological specimen, e.g., a specimen on a substrate such as a glass slide, while excluding the un-needed area ("X" area), so that only the "S" area is used as the input material for the downstream assay. In certain cases, a complex "S" shape definition from a pathologist can result in difficult scraping operations for a histo-technician. In some embodiments, the sample is a liquid biopsy sample, such as a blood sample. In such embodiments, a region of interest could be droplets of the liquid biopsy (e.g. blood droplets) containing a cell of interest, and the region of non-interest could be droplets of the liquid biopsy (e.g. blood droplets) not containing cells of interest.

As used herein, the term "particulate" substance means a substance comprised of particles, such as substantially spherical particles or less irregularly shaped particles. Typically, the particulate substances have a diameter of about 10 nm to about 100 μm; preferably from about 50 to about 400 nm; especially from about 100 to about 200 nm.

As used herein, the term "assay" is a test or testing for the quantity, presence, or absence of a substance.

As used herein, the term "pressurized" air means air that has been compressed, e.g., with pressure that is greater than atmospheric pressure. The "air" component in such pressurized air is typically an inert gas selected from helium, argon, xenon, nitrogen, carbon dioxide, oxygen, or a mixture thereof. As is typical in pressurized systems, the "air" component may be in liquid, semi-liquid, or gaseous form.

As used herein, "contacting" means that the composition comprising an agent (e.g. contact medium) is introduced into a sample containing a target, e.g., cell target, in a test tube, flask, tissue culture, chip, array, plate, microplate, capillary, or the like, and incubated at a temperature and time sufficient to permit an interaction between the target and the agent.

In the in vivo diagnostic or therapeutic context, "contacting" means that an active ingredient (e.g., a chemical compound or a drug) is introduced into a subject, and the active ingredient is allowed to come in contact with the subject's target tissue, e.g., epithelial tissue, in vivo.

As used herein, the term "subject" means any animal, preferably a mammal such as a human, a veterinary or farm animal, a domestic animal or pet, including animals normally used for clinical research. In some embodiments, the subject is a human subject. In some embodiments, the subject is a human patient diagnosed with disease such as cancer. A subject may have, potentially have, or be suspected of having one or more characteristics or symptoms associated with a disease. A subject may be asymptomatic with respect to a disease, or may be undiagnosed with a disease. In some embodiments, the subject may have cancer. In some embodiments, the subject may show a symptom(s) associated with cancer. In some embodiments, the subject may be free from symptoms associated with cancer, or the subject may not be diagnosed with cancer.

As used herein, the term "noise" in its broadest sense refers to any undesired disturbances (e.g., signal not directly associated with the true event) which may nonetheless be processed or received as true events. Noise is the summation of unwanted or disturbing energy introduced into a system from man-made and natural sources. Noise may distort a signal such that the information carried by the signal becomes degraded or less reliable. The term is contrasted with "signal," which is a function that conveys information about the behavior or attributes of some phenomenon, e.g., probabilistic association between a marker (SNV, CNV, indel, SV) and a disease such as cancer.

As used herein, the term "estimate" in the context of marker levels is used in a broad sense. As such, the term "estimate" may refer to an actual value (e.g., 1 variation per mbp DNA), a range of values, a statistical value (e.g., mean, median, etc.) or other means of estimation (e.g., probabilistically).

As used herein, the term "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent.

As used herein, the term "component" refers to constituent of a system. For example, in a cell system, components may include polypeptides (e.g., small peptides as well as large proteins), nucleic acids (e.g., DNA or RNA), carbohydrates (e.g., simple sugars as well as macromolecules such as starch), lipids, and other constituents such as vitamins and cholesterol.

As used herein, the terms "transfer" or "transferring" are used in the broadest sense to refer to any act or method of moving or copying a marking from one entity to another entity or converting a marking from one form to another form. In some embodiments, the term "transferring" refers to moving or copying a marking from one entity to another entity. In some embodiments, the term "transferring" refers to moving or copying a marking from one slide or an image thereof to another slide or an image thereof. For example, in some embodiments "transferring" refers to moving or copying a marking from a stained slide or an image thereof to an unstained slide or an image thereof. In some embodiments, "transferring" refers to moving or copying a digital marking from an image of a stained slide to an image of an unstained slide. In some embodiments, "transferring" refers to converting a digital marking from an image of a stained slide to a marking on an unstained slide, such as a physical or manual marking on an unstained slide. In some embodiments, "transferring" refers to converting a marking from one form (e.g. a digital marking) into another form, such as coordinates. For example, in some embodiments "transferring" refers to converting a digital marking on a slide or an image thereof into coordinates. As used herein, the term "covalent" interactions involve sharing of electrons between the bonded atoms. In contrast, "non-covalent" interactions may include, for example, ionic interactions, electrostatic interactions, hydrogen bonding interactions, physiochemical interactions, van der Waal forces, Lewis-acid/Lewis-base interactions, or combinations thereof.

As used herein, the term "analyte" generally refers to a target molecule(s) that is detected using the methods or systems disclosed herein. The analyte can be a DNA analyte, an RNA analyte, a nucleic acid analyte, macromolecule or a small molecule as those terms are used in the art. In particular, a macromolecule may include, for example, a polynucleotide, a polypeptide, a carbohydrate, a lipid, or a combination of one or more of these. As a general rule, the molecular mass of a macromolecule is at least about 300 Daltons and can be millions of Daltons. A small molecule is an organic compound having a molecular weight of up to about 300 Daltons. In certain instances, the analyte is a nucleic acid analyte.

As used herein, a "probe" is a substance, e.g., a molecule, which can recognize or be specifically recognized by a particular target. The types of potential probe/target or target/probe binding partners include receptor/ligand; ligand/anti-ligand; nucleic acid (polynucleotide) interactions, including DNA/DNA, DNA/RNA, PNA (peptide nucleic acid)/nucleic acid; enzymes, other catalysts, or other substances, with substrates, small molecules or effector molecules; etc. Examples of probes that are contemplated by this disclosure include, but are not limited to, peptides, enzymes (such as proteases or kinases), enzyme substrates, cofactors, drugs, lectins, sugars, nucleic acids (including oligonucleotides, DNA, RNA, PNA or modified or substituted nucleic acids), oligosaccharides, proteins, enzymes, polyclonal and monoclonal antibodies, single chain antibodies, or fragments thereof. Probe polymers can be linear or cyclic. Probes can distinguish between different targets, either by virtue of differential activity, differential binding or through identification from structural markers. The probes of the disclosure are preferably nucleic acid molecules, particularly preferably DNA. In certain instances, "probes" may function as "targets" and "targets" may function as probes, e.g., a complementary DNA (cDNA) may serve as a probe that hybridizes to a portion of a target gene sequence; however, the cDNA itself corresponds to the target sequence since it matches with the mRNA product of the gene sequence.

As used herein, the term "analysis" as well as the phrase "detection" may refer to qualitative or quantitative determination of a parameter of interest concerning the analyte, e.g., amount, level, concentration, or activity of the analyte (both absolute and relative).

As used herein, the term "diagnosis" refers to methods by which a determination can be made as to whether a subject is likely to be suffering from a given disease or condition. The skilled artisan often makes a diagnosis on the basis of one or more diagnostic indicators, e.g., a marker, the presence, absence, amount, or change in amount of which is indicative of the presence, severity, or absence of the disease or condition. Other diagnostic indicators can include patient history; physical symptoms, e.g., unexplained weight loss, fever, fatigue, pains, or skin anomalies; phenotype; genotype; or environmental or heredity factors. A skilled artisan will understand that the term "diagnosis" refers to an increased probability that certain course or outcome will occur; that is, that a course or outcome is more likely to occur in a patient exhibiting a given characteristic, e.g., the presence or level of a diagnostic indicator, when compared to individuals not exhibiting the characteristic. Diagnostic methods of the disclosure can be used independently, or in combination with other diagnosing methods, to determine whether a course or outcome is more likely to occur in a patient exhibiting a given characteristic.

The term "nucleic acid" generally refers to DNA or RNA, whether it is a product of amplification, synthetically created, products of reverse transcription of RNA or naturally occurring. Typically, nucleic acids are single- or double-stranded molecules and are composed of naturally occurring nucleotides. Double-stranded nucleic acid molecules can have 3' or 5' overhangs and as such are not required or assumed to be completely double-stranded over their entire length. Furthermore, the term nucleic acid can be composed of non-naturally occurring nucleotides and/or modifications to naturally occurring nucleotides. Examples are listed herein but are not limited to: phosphorylation of 5' or 3' nucleotides to allow for ligation or prevention of exonuclease degradation/polymerase extension, respectively; amino, thiol, alkyne, or biotinyl modifications for covalent and near covalent attachments; fluorophores and quenchers; phosphorothioate, methylphosphonates, phosphoroamidates and phosphorotiester linkages between nucleotides to prevent degradation; methylation; and modified bases.

The term "polypeptide" when used herein means a peptide, a protein, or a polypeptide which are used interchangeably, and which encompasses amino acid chains of a given length, wherein the amino acid residues are linked by covalent peptide bonds. The term polypeptide also refers to, and does not exclude, modifications of the polypeptide. Modifications include glycosylation, acetylation, acylation, phosphorylation, ADP-ribosylation, amidation, covalent attachment of flavin, covalent attachment of a heme moiety, covalent attachment of a nucleotide or nucleotide derivative, covalent attachment of a lipid or lipid derivative, covalent attachment of phosphotidylinositol, cross-linking, cyclization, disulfide bond formation, demethylation, formation of covalent cross-links, formation of cysteine, formation of pyroglutamate, formulation, gamma-carboxylation, glycosylation, GPI anchor formation, hydroxylation, iodination, methylation, myristoylation, oxidation, pegylation, proteolytic processing, phosphorylation, prenylation, racemization, selenoylation, sulfation, transfer-RNA mediated addition of amino acids to proteins such as arginylation, and ubiquitination.

As used herein, the term "isolated" or "extracted" in the context of a molecule refers to a molecule that is substantially free of impurities. A molecule (such as, DNA or RNA) has been "isolated" or "extracted" when it is purified away from other components in a sample. Purification refers to separating the target from one or more extraneous components also found in a sample. Components that are isolated, extracted or purified from a mixed specimen or sample typically are purified or enriched by at least 50%, at least 60%, at least 75%, at least 90%, or at least 98% or even at least 99% compared to the unpurified or non-extracted sample.

The term "synthetic" refers to molecules that have been chemically synthesized using art-understood techniques, e.g., using phosphoramidite chemistry or synthetic chemistry.

The term "hybrid" or "hybridize" in the context of a nucleic acid is broadly meant to include duplexes as well as molecules that are capable of such forming duplexes. In this context, single-stranded nucleic acids that base pair over a number of bases are said to "hybridize." Hybridization is typically determined under physiological or biological conditions (e.g., intracellular: pH 7.2, 140 mM potassium ion; extracellular: pH 7.4, 145 mM sodium ion).

As used herein, the term "analog" includes, but is not limited to, oligonucleotides having residues or linkers synthetically introduced therein, such as a ribonucleic acid residue within a DNA sequence, a branching linking agent such as a glycerol derivative, or an aminoalkyl linker, for example. "Adducts" include, for example, O6-alkyl-dG and O6-Me-dG. Likewise, the term "conjugate" in one embodiment, refers to a target recognition agent covalently or non-covalently bound to one or more polynucleotides. In another embodiment, term "conjugate" refers to a linear, branched, or dendritic polynucleotide covalently or non-covalently to one or more fluorescent dye molecules.

As used herein, "target" refers to a substance whose presence, activity and/or amount is desired to be determined and which has an affinity for a given probe. Targets can be man-made or naturally-occurring substances. Also, they can be employed in their unaltered state or as aggregates with other species. Targets can be attached, covalently or non-covalently, to a binding member, either directly or via a specific binding substance. Examples of targets which can be employed in this disclosure include, but are not limited to, nucleic acids or polynucleotides (including mRNA, tRNA, rRNA, oligonucleotides, DNA, viral RNA or DNA, ESTs, cDNA, PCR-amplified products derived from RNA or DNA, and mutations, variants or modifications thereof); proteins (including enzymes, such as those responsible for cleaving neurotransmitters, proteases, kinases and the like); substrates for enzymes; peptides; cofactors; lectins; sugars; polysaccharides; cells (which can include cell surface antigens); cellular membranes; organelles; etc., as well as other such molecules or other substances which can exist in complexed, covalently bonded, crosslinked, etc. form. Targets can also be referred to as anti-probes.

Wherein the probe binds to a target sequence, the binding may be "specific" or "selective." In general, if a probe has one and only one binding partner (e.g., target), it possesses the property of "specificity." In practicality, the vast majority of probes are "selective" rather than "specific" because most probes will bind to a number of targets, particularly at high concentrations. Thus, the terms are used interchangeably. Specificity and selectivity of binding can be determined using routine methods. For instance, wherein the target is a particular mRNA, the probe can be, e.g., an oligonucleotide, which binds specifically to the target but not to interfering RNAs or DNAs, under selected hybridization conditions. One of skill in the art can, using art-recognized methods, determine experimentally the features of an oligonucleotide that will hybridize optimally to the target, with minimal hybridization to non-specific, interfering DNA or RNA (e.g., see above). In general, the length of an oligonucleotide probe used to distinguish a target mRNA present in a background of a large excess of untargeted RNAs can range from about 8 to about 50 nucleotides in length, preferably about 18, 20, 22 or 25 nucleotides. An oligonucleotide probe for use in a biochemical assay in which there is not a large background of competing targets can be shorter than 8 nucleotides. Using art-recognized procedures (e.g., the computer program BLAST), the sequences of oligonucleotide probes can be selected such that they are mutually unrelated and are dissimilar from potentially interfering sequences in known genetics databases. The selection of hybridization conditions that will allow specific hybridization of an oligonucleotide probe to the RNA target can be determined routinely, using art-recognized procedures.

As used herein, the term "primer" refers to short nucleic acid molecules, such as DNA oligonucleotides comprising nine or more nucleotides, which in some examples is used to initiate the synthesis of a longer nucleic acid sequence. Longer primers can be about 10, 12, 15, 20, 25, 30 or 50 nucleotides or more in length. Primers may also be used in detection.

"Mechanically removing or ablating" certain samples from a substrate herein means either separating that sample from the substrate or vaporizing or otherwise decomposing the sample by mechanical means so that it is no longer present on the substrate.

To "decompose" macromolecules chemically herein means to denature or break down macromolecules such as RNA, DNA, and/or proteins or to chemically modify them sufficiently that they will not contaminate a later analysis of RNA, DNA, and/or proteins in ROI tissue.

A "mark" made on a slide by a pathologist or laboratory user or other individual is referred to herein as a "manual mark." Such a mark may be made by any available means, such as with a physical or virtual pen or etching equipment. A mark or a feature that is made automatically by a system herein, in contrast, may be termed a "virtual mark" or a "digital mark" or a "digital feature" to indicate that it is not made manually but by the use of one or more algorithms.

The terms "digital," "digitized," "automated," and "automatically" and the like indicate actions that are performed by a system herein, for example, controlled by algorithms and/or by interaction between a user and a computer user interface as opposed to actions that are performed by a user without the assistance of an algorithm, a computer, a computer user interface, or the like. In contrast, the terms "manual" or "manually" refer to actions that are performed by a user/operator. In some embodiments, a "manual" action may involve an operator instructing an application, such as a software, firmware, or hardware, to perform/execute a task. The terms "user" and "operator" are used interchangeably herein to refer to a person. In some embodiments, a "user" or an "operator" refers to a person using a component of a system or performing a part of a method described herein, including a histologist, a pathologist, etc.

As used herein, the term "surface" refers to any matter that provides a site which permits interaction between an analyte or a probe of interest. Preferably, the surface is a surface of a solid support, e.g., nitrocellulose, the walls of wells of a reaction tray, multi-well plates, test tubes, polystyrene beads, magnetic beads, membranes, and microparticles (such as latex particles). Any suitable porous material with sufficient porosity to allow access by detector reagents and a suitable surface affinity to immobilize capture reagents (e.g., oligonucleotides) is contemplated by this term. For example, the porous structure of nitrocellulose has excellent absorption and adsorption qualities for a wide variety of reagents, for instance, capture reagents. Nylon possesses similar characteristics and is also suitable. Microporous structures are useful, as are materials with gel structure in the hydrated state. Further examples of useful solid supports include natural polymeric carbohydrates and their synthetically modified, cross-linked or substituted derivatives, such as agar, agarose, cross-linked alginic acid, substituted and cross-linked guar gums, cellulose esters, especially with nitric acid and carboxylic acids, mixed cellulose esters, and cellulose ethers; natural polymers containing nitrogen, such as proteins and derivatives, including cross-linked or modified gelatins; natural hydrocarbon polymers, such as latex and rubber; synthetic polymers which may be prepared with suitably porous structures, such as vinyl polymers, including polyethylene, polypropylene, polystyrene, polyvinylchloride, polyvinylacetate and its partially hydrolyzed derivatives, polyacrylamides, polymethacrylates, copolymers and terpolymers of the above polycondensates, such as polyesters, polyamides, and other polymers, such as polyurethanes or polyepoxides; porous inorganic materials such as sulfates or carbonates of alkaline earth metals and magnesium, including barium sulfate, calcium sulfate, calcium carbonate, silicates of alkali and alkaline earth metals, aluminum and magnesium; and aluminum or silicon oxides or hydrates, such as clays, alumina, talc, kaolin, zeolite, silica gel, or glass (these materials may be used as filters with the above polymeric materials); and mixtures or copolymers of the above classes, such as graft copolymers obtained by initializing polymerization of synthetic polymers on a preexisting natural polymer.

As used herein, the term "signature" refers to a collection of markers which indicate a phenotype of interest, e.g., a cancer signature comprising >3 mutations which indicates that the cell or tissue harboring the mutations is a tumor cell. In some embodiments, a signature comprises the presence, absence, and/or abundance of a combination of the markers, e.g., tumor markers. By combining the various probe sets, a reliable method for the detection of a phenotype of interest can be designed. Such a signature test that is conducted as a single assay can provide great benefit for assessing and understanding the interplay between the various markers.

The term "amplification" generally refers to the production of a plurality of nucleic acid molecules from a target nucleic acid wherein primers hybridize to specific sites on the target nucleic acid molecules in order to provide an initiation site for extension by a polymerase. Amplification can be carried out by any method generally known in the art, such as but not limited to, standard PCR, long PCR, hot start PCR, qPCR, RT-PCR and real time PCR.

The term "antibody" as used herein refers to a complete immunoglobulin, such as an IgA, IgD, IgE, IgG or IgM or to a fragment of an antibody (especially an antigen-binding fragment), such as a Fab, Fv or Fc or a fused antibody, a fused antibody fragment or any other derivative of an antibody. The term "labeled antibody" refers to an antibody that is labeled with an enzyme, a fluorescent dye, a chemiluminescent substance, biotin, avidin or a radioisotope.

The term "epitope" refers to an antigenic region of a compound, such as a protein, a carbohydrate or a lipid. The antigenic region typically consists of 5 to 8 amino acids. The epitope is specifically recognized by the antigen binding sites of the respective antibody.

The term "fixed tissue or cell" is used herein as known to the expert skilled in the art and refers to biological tissue or cells which are preserved from decay by chemical fixation methods. Such methods prevent autolysis or putrefaction within such biological tissue or cells. Fixation terminates biochemical reactions and increases the mechanical stability of the treated tissue.

The term "immuno-histochemistry" or "IHC" refers to a technique for detecting the presence of an antigen with an antibody capable of specifically binding to said antigen in histological samples. The detection of the antibody-antigen complex occurs usually by a chromogenic reaction with an enzyme-labeled antibody or by a fluorescent labeled antibody.

The term "macrodissection" as used herein refers to the process of removing an area of interest from a tissue section mounted on a solid support, such as a microscope slide, by using a tool such as a scalpel, blade, or a spatula. The term "microdissection" as used herein refers to the process of cutting and separating one or more specific cells or an area of interest from a tissue sample. Microdissection can for example be performed using laser capture microdissection (LCM) by cutting the relevant area with a laser.

The term "membrane slide" as used herein refers to solid supports or microscope slides for use in Laser Capture Microdissection (LCM). For microdissection glass slides covered with a membrane or frame slides that consist of a metal frame which can be covered with various membranes can be used.

The term "poly-lysine" refers to a molecule that contains up to several hundreds of repeating units and is suitable for increasing the affinity between a sample, such as a tissue section, and the membrane side onto which the sample is mounted. A poly-lysine according to the description is poly-L-lysine. Poly-L-lysine according to the description has a molecular weight from 70 to 300 kDa. Poly-L-lysine can be digested by proteases. Another poly-lysine according to the description is for example poly-D-lysine. Poly-D-lysine according to the description has a molecular weight from 70 to 300 kDa. Poly-D-lysine is resistant to protease digestion.

The term "qPCR" generally refers to the PCR technique known as real-time quantitative polymerase chain reaction, quantitative polymerase chain reaction or kinetic polymerase chain reaction. This technique simultaneously amplifies and quantifies target nucleic acids using PCR wherein the quantification is by virtue of an intercalating fluorescent dye or sequence-specific probes which contain fluorescent reporter molecules that are only detectable once hybridized to a target nucleic acid.

The term "RNA" is used herein as known to the expert skilled in the art and refers to pre-mRNA, pre-mRNA transcripts, mRNA, transcript processing intermediates, mature mRNA used for translation and transcripts from a gene or genes, or nucleic acids derived therefrom. Transcript processing includes processes such as splicing, editing, modifying and degrading. mRNA including samples include, e.g., mRNA, mRNA transcripts of the gene or genes, cDNA originating from mRNA using reverse transcription, RNA transcribed from amplified DNA, cRNA transcribed from cDNA, DNA amplified from the genes, and the like.

A "container" that may comprise a sample herein is broadly construed to mean any type, shape, or size of container, including a surface, a well, a tube, or a vial. A container is not required to have any particular shape or size to be made out of any specific materials, but merely to act as physical structures that enables analysis or manipulation of tissue located in or on it.

A "stained" slide/substrate herein refers to a substrate containing a sample that has been treated to assist in revealing differences between regions within a sample. In some embodiments, the sample is treated before being mounted or otherwise placed on the slide. In some embodiments, the sample is treated after being mounted or otherwise placed on the slide. Reference to a "stained slide" or a slide being "treated" is used herein to describe both of these instances, namely a slide containing a tissue that was treated prior to being placed on the slide and a slide containing a tissue that is treated after being placed on the slide. In some embodiments, a "stained" slide refers to a slide that has been treated to assist in revealing differences between regions of interest and regions of non-interest in a sample, so that a pathologist or other trained individual may mark the substrate to denote the outline of any ROIs on the substrate. In some embodiments, a "stained" slide is treated with a dye.

Suitable dyes include, for example, hematoxylin, a basic dye that stains acidic structures and results in a purple/blue hue, and eosin, which stains structures a pink/red hue. Additional exemplary stains include, but are not limited to, Giemsa stain, Periodic Acid Schiff reaction (PAS) stain, trichome stain, Congo Red, Prussian Blue, Mucicarmine, Sudan Black, Oil Red O, Nissl stain (also known as Cresyl Violet Stain), and Papanicolaou Stain. In some embodiments, a "stained" slide is treated with an ion. For example, in some embodiments a "stained" slide is a Silver stained slide. In some embodiments, a "stained" slide is an immunohisto-chemistry stained slide (e.g. a slide containing tissue that has been subjected to an immunohistochemistry procedure). For example, the "stained" slide may be contacted with an antibody to detect an antigen, if present in the sample. In some embodiments, a "stained" slide is treated with light, and one or more properties of the sample on the slide is measured. For example, the slide may be treated with light and one or more optical properties of the sample, including light scattering properties, may be measured. An "unstained" slide/substrate is a substrate that has not been so treated but that may or may not have been subjected to other types of treatments. Accordingly, an "unstained" slide/substrate may be one that has not been treated with a dye or light.

The term "separating" as used herein refers to any suitable means for isolating a particular region from a sample. In some embodiments, "separating" refers to isolating one or more regions of interest from a sample. In some embodiments, "separating" refers to isolating one or more regions of non-interest from a sample, leaving behind the regions of interest on the substrate. Suitable methods for "separating" include physical removal of the region (e.g. cutting and removing), ablating the region (e.g. vaporization, ablation, or physical decomposition), or chemical treatment of the region. In some embodiments, "separating" refers to a dissection performed on a tissue sample. Such a dissection (e.g. macrodissection, microdissection) may be performed to remove one or more regions of interest, or may be performed to remove one or more regions of non-interest. In some embodiments, "separating" refers to isolating one or more droplets present in a liquid sample (e.g. a blood sample). For example, "separating" may refer to isolating one or more droplets of a liquid sample containing a cell of interest. As another example, "separating" may refer to isolating one or more droplets of a liquid sample not containing a cell of interest, thereby leaving only droplets containing the cell of interest on the substrate for further assessment.

The term "substrate" herein refers to various slides including, but not limited to, FFPE slides, tissue slides, standard slides, containers, stained slides, unstained slides, living tissue, cellular layers attached to glass or polymer containers, etc. In some embodiments, the substrate is a slide containing a liquid biopsy sample (e.g. a blood sample).

A "computer processor" or "computing means" or "computer" is broadly construed herein to refer to any hardware and/or software combination that will perform the functions required of it. For example, a processor may be a programmable digital microprocessor such as available in the form of an electronic controller, mainframe, server, or personal computer (desktop or portable). Where the processor is programmable, suitable programming can be communicated from a user interface either incorporated into the computer body or at a remote location to the processor, or previously saved in a computer program product (such as a portable or fixed computer readable storage medium, whether magnetic, optical or solid-state device based). For example, a magnetic medium or optical disk may carry programming and can be read by a suitable reader communicating with each processor at its corresponding user interface. A "user interface" herein is broadly construed to mean a physical structure that allows a user to program a computer and thus to control certain operations of a system through the computer. Examples include a mainframe or laptop computer keyboard and monitor, other type of visual monitor and keyboard system such as a pad-type or smart-phone type device or other remote devices. The user interface may be either physically part of the computer body, located elsewhere in the system, or located remotely from the computer, and able to communicate with the computer processor through a wired or wireless connection.

Current processes of transferring markings from a stained slide to an unstained slide may rely on completely manual, physical alignments of the two slides. However, this physical alignment of two slides can be challenging for various reasons. For example, tissue from the unstained slide may not be completely secured to the slide, which may result in tissue sliding, folding, stretching, or otherwise moving on the slide during or prior to the attempted physical alignment. Moreover, in some instances slides may have one or more labels (e.g. stickers), which can cause an uneven slide surface and make manual alignment of slides difficult. Visual and manual handling of the slides is ergonomically challenging for a user (e.g. a histologist), which can lead to health problems such as carpal tunnel syndrome or eye strain. Moreover, the process of a completely manual alignment of two slides (e.g. a stained slide and an unstained slide) can be time consuming and is often limited by the number of slides a user (e.g. histologist) can successfully align in a given day. Furthermore, pen markings can fade over time and are difficult to correct if an error is noted after the marking is made. Accordingly, methods for digitally marking images of slides, rather than physically marking slides themselves, are desirable.

Current digital pathology annotation methods exist, but these methods require automated alignment between the two digital images. Such an alignment is also referred to as registration. Current image registration processes rely on algorithms, which are prone to failures and do not achieve close to 100% success rate. Such algorithms often rely on pixel-by-pixel recognition and an automated alignment of two images based upon image landmarks. However, image landmarks can move, shift, or look different in different slides based upon slicing, mounting, and staining the tissue, leading to registration failures. For example, in some instances different slices from a tissue may have been stretched, folded, or otherwise changed in shape during tissue collection and/or mounting on a slide. Such stretching or folding may cause image registration to fail. As another example, for some tissues containing a high amount of fat, the fat is clear in a stained slide but is not clear in an unstained slide. Such difference in opacity of the tissue may also cause algorithm-based image registration to fail. Instances wherein algorithm-based image registration processes fail are sometimes referred to as "fringe" cases. When image registration algorithms fail, markings from a stained slide cannot successfully be transferred to an unstained slide or an image of the unstained slide. It is difficult to improve image registration algorithm success rates.

The presently described systems and methods address the above-described issues.

In some aspects, provided herein are systems, tools, and methods of transferring pathologist markings. In some embodiments, provided herein are systems and methods for physical marking of slides. In some embodiments, provided herein are systems and methods for digital marking of slides. In some embodiments, the system and methods described herein can be used for physical marking of slides and digital marking of slides. The systems and methods described herein are advantageous in that the methods are performed at least in part manually, without the need for image registration algorithms that are prone to failures. Moreover, the systems and methods described herein are advantageous in that the methods are performed at least in part digitally, using images of a stained slide or an unstained slide, thus avoiding the need for a purely manual transfer of markings from one physical slide to another physical slide.

In some aspects, the disclosure of the present application herein is directed to systems, tools, and methods of transferring pathologist markings suitable, for example, for histology and/or pathobiology. The methodologies and approaches disclosed herein can improve reliability and consistency in making, converting, and/or transferring markings for use in automatic downstream analysis or processing of biological specimens. Typically, sample analysis and dissection typically involve a series of slides (e.g., glass slides or microscope slides). In some embodiments, the series of slides comprise parallel slices of biological specimens (samples). In some embodiments, the slides comprise liquid biological samples (e.g. blood samples).

In some embodiments, one or more slides in a set may be stained, for example, to reveal individual cell nuclei and/or to help distinguish cells of different types, such as in oncology applications, cancerous and non-cancerous cells. A pathologist may examine a substrate and mark regions of interest (ROIs) on the slide with a pen or other suitable marking device. In some embodiments, the markings are placed on a cover slide on top of the sample. In some embodiments, the markings are placed underneath the slide, such as for liquid biopsy samples that may not comprise a cover slide. These ROIs or the associated pen markings may then be mapped (rotated and aligned) with a substrate from one or more adjacent slice(s) of sample, that will ultimately be analyzed, such as to extract DNA for genomic sequencing, RNA for RNA expression analysis or to perform in situ analysis of cells, etc. In conventional sample dissection methods, the pathologist's pen mark is transferred by hand to a substrate and a razor blade is used to cut out the ROI from surrounding samples on the slide.

In accordance with various embodiments described herein, a tool or system can be implemented for transferring markings, such as pathologist markings, either physically or digitally. In some embodiments, provided herein is a system for transferring markings physically and/or digitally. In some embodiments, the system includes an imaging device for imaging a stained slide, and in some cases an unstained slide. In some embodiments the system also includes a display for displaying one or more images taken with the imaging device. In addition, the system can include a mechanical stage, such as a scaffold, for positioning or orienting the stained slide with respect to the unstained slide. In some embodiments, the mechanical stage is positioned manually. For example, the stage may be moved (e.g. raised, lowered, shifted, rotated) in order to position or orient the stained slide with respect to the unstained slide. The stage may be moved manually directly by an operator. Alternatively, the movements of the stage may be controlled by an affiliated application such as a software, hardware, etc., but the operator may instruct the affiliated application to position the stage at a suitable location determined by the operator. The term "manually" or "manual" when used in reference to positioning, movement, or operation of the scaffold/stage refers to each of these instances, namely a direct positioning/movement/operation of the stage by the operator and/or the operator instructing an affiliated application to the position/move/operate the stage in a suitable manner to facilitate the desired alignment of the slides. This can enable physical marking of the unstained slide based on the markings on the stained slide. In some cases, an application such as a custom design software program can be used to digitally draw one or more features based on the physical marking and transfer the physical marking into coordinates, so that they can be used for further processing, such as for dissection.

In accordance with various embodiments, a tool or system can be designed for transferring pathologist markings. In some embodiments, provided herein is a system for transferring pathologist markings. In some embodiments, the system includes an imaging device for imaging a stained slide and an unstained slide and a display for displaying one or more images of the stained slide and the unstained slide. In some embodiments, the system is coupled with a first application for aligning the images to enable digital marking of the unstained slide, and with a second application for digitally marking one or more features and transferring the digital markings into coordinates. In some embodiments, the coordinates are to be used for further processing, such as for dissection or for isolation of one or more droplets from a liquid biopsy sample (e.g. a blood sample). In various embodiments, the first application can be used for semi-manual processing or semi-automation, whereas the second application can be used via algorithm-based processing. For example, in some embodiments the first application is a software program that is operated by a user (e.g. an operator). The operator manually aligns the images using visual cues, and utilizes the software application to align (e.g. shift, move, zoom, pan, rotate, mirror, etc.) the images. The software program may track the amount of movement that occurs and stores these movements as coordinates. Such coordinates can be used for further processing. For example, such coordinates can be applied to the image of the unstained slide or to the unstained slide itself in order to aid in marking the image of the unstained slide, marking the unstained slide, and/or dissection tissue from the unstained slide. Such a system/method is in contrast to methods that are algorithm-based, which do not necessitate an operator performing manual alignments of images.

For any of the embodiments described herein, the "stained" slide refers to a substrate containing a sample that has been treated to assist in revealing differences between regions within a sample. In some embodiments, a "stained" slide is treated with a dye. Suitable dyes include, for example, hematoxylin, a basic dye that stains acidic structures and results in a purple/blue hue, and eosin, which stains structures a pink/red hue. Additional exemplary stains include, but are not limited to, Giemsa stain, Periodic Acid Schiff reaction (PAS) stain, trichome stain, Congo Red, Prussian Blue, Mucicarmine, Sudan Black, Oil Red O, Nissl stain (also known as Cresyl Violet Stain), and Papanicolaou Stain. In some embodiments, a "stained" slide is treated with an ion. For example, in some embodiments a "stained" slide is a Silver stained slide. In some embodiments, a "stained" slide is an immunohistochemistry stained slide (e.g. a slide containing tissue that has been subjected to an immunohistochemistry procedure).

In some embodiments, a "stained" slide is treated with light, and one or more properties of the sample on the slide is measured. For example, the slide may be treated with light and one or more optical properties of the sample, including light scattering properties, may be measured. Exemplary light scattering properties that may be measured include, for example, wavelength-dependent light scattering (e.g. using elastic-scattering spectroscopy, light-scattering spectroscopy, diffuse reflectance modeling, spectroscopic optical coherence tomography (OCT), dark-field spectral scatter imaging, partial wave spectroscopy), angle-resolved light scattering, or Fourier-domain methods. In contrast to the above, an "unstained" slide/substrate is a substrate that has not been so treated but that may or may not have been subjected to other types of treatments. Accordingly, an "unstained" slide/substrate may be one that has not been treated with a dye or light.

Further details are provided below with respect to FIGS. 1-6.

FIG. 1 is a schematic illustration of a system 100 for transferring markings, according to various embodiments. As shown in FIG. 1, the system 100 includes an intake stage 120, an operation stage 140, an output stage 160, and optionally, an ancillary stage 180. As illustrated, the intake stage 120 represents a stained slide having pathologist markings and/or pre-markings on a sample (e.g., biological specimen). In various embodiments, the stained slide can include, among many others, hematoxylin and eosin stained slide or immunohistochemistry stained slide. In various embodiments, an image of the stained slide with the markings can be captured via an imaging device (also referred to herein as "electronic microscope"), for example, such as a microscope or an optical microscope connected to a camera, such as a digital camera (CCD or CMOS cameras) or a video camera with zooming, panning, and/or focusing capabilities in two and three-dimensional spaces.

Upon inputting the stained slide having pathologist markings or pre-markings into the operation stage 140, the operation stage 140 represents an operation process that includes at least marking, converting, and/or transferring the markings onto an unstained slide. In various embodiments, the pre-markings can be used as a guideline in the transfer of physical markings onto the unstained slide. In various embodiments, a software application can be used in recognizing the physical markings and for converting the physical markings into one or more features, e.g., digital features, that are to be transferred to the unstained slide. In various embodiments, the software application can be a metrology software program used for inspection of physical properties of the stained slide or the unstained slide. In various embodiments, the physical markings can be one or more dots, straight or curve lines, or a polyline that an operator can draw on a display or a projector, or directly on the unstained slide. Such physical markings can be converted into one or more digital features. Accordingly, the digital features can be one or more dots, straight of curved lines, or a polyline.

During the operation stage 140, a software application can be used for aligning one or more images of the stained slide or unstained slide. In accordance with various embodiments, aligning using the application can include positioning and orienting of the images, as well as performing one or more operations of panning, rotating, zooming in or zooming out (generally referred to herein as "zooming") in any direction, e.g., 2 dimensions or 3 dimensions, mirroring, or overlaying of the images. In some embodiments, aligning the one or more images of the stained slide or the unstained slide is performed by an operator, using the software application. For example, the operator may manually align the one or more images based upon visual cues in each image. However, the alignment itself (e.g. moving, shifting, rotating images) is performed by the operator using a software application that induces the desired movements selected by the operator in the images of the slides. This is in contrast to other methods of aligning an image of a stained slide and an unstained slide that are fully automated (e.g. performed using an algorithm, rather than performed manually by an operator with the assistance of a software application).

In various embodiments, a second software application can be used for digitally marking one or more features and transferring the digital marking of the one or more features into coordinates. In various embodiments, a low-resolution image of the stained slide can be used for recognizing of the physical markings and converting the physical markings into the features. The low-resolution refers to images taken with a magnification factor lower than or equal to 20× (i.e., 20 times). For example, the low-resolution image is an image taken with a magnification factor lower than or equal to 2×, 3×, 5×, 7×, 10×, 15×, or 20×. In various embodiments, one or more boundary edges or corners of the low-resolution image can be used in recognizing and converting of the physical markings into the one or more features.

As further illustrated in FIG. 1, the output of the unstained slide with transferred markings represents the stage 160. Once the markings have been transferred onto the unstained slide, the sample can be further processed in one or more downstream processes (e.g., dissection), which is represented by the stage 180.

Figure 2:
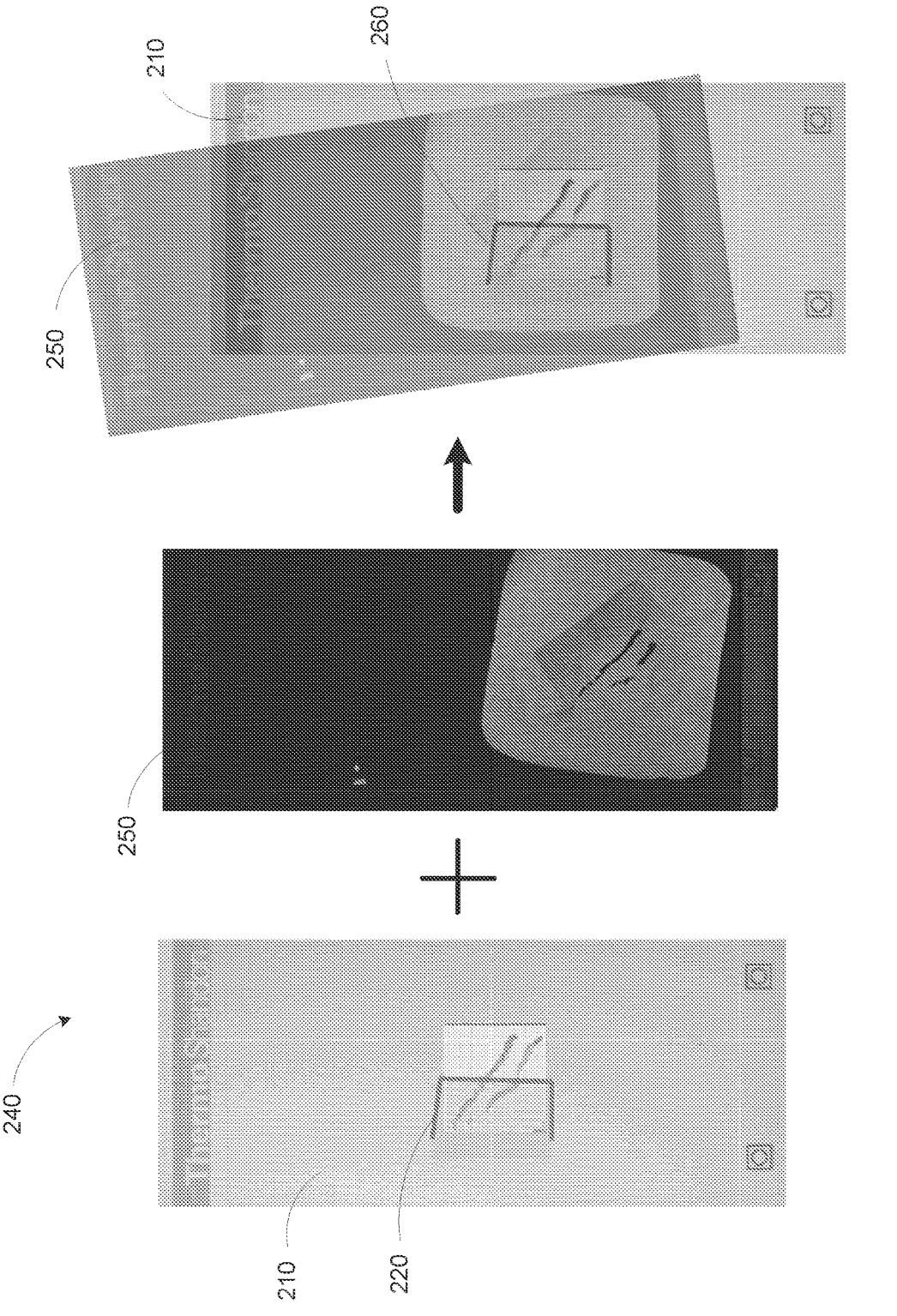
FIG. 2 illustrates an example embodiment of a system for transferring markings, according to various embodiments.

FIG. 2 illustrates an example embodiment 240 of a system for transferring markings, according to various embodiments. In the embodiment 240 illustrated in FIG. 2, a stained slide 210 having a marking 220 is shown to align with an unstained slide 250, indicated by a sign "+", which results in an overlay of the two slides 210 and 250. In various embodiments, an image of the stained slide 210 can be used instead of the stained slide 210. In various embodiments, an image of the unstained slide 250 can be used instead of the unstained slide 250. As illustrated on the right side of FIG. 2, the overlay illustrates the unstained slide 250 rotated and shifted up with respect to the stained slide 210 in order to align the marking 220. In some embodiments, such an alignment (e.g. rotating and shifting in order to align the marking 220) is performed manually by an operator based upon visual cues in the images, rather than by using a fully automated method (e.g. rather than using an algorithm.)

Figure 3:
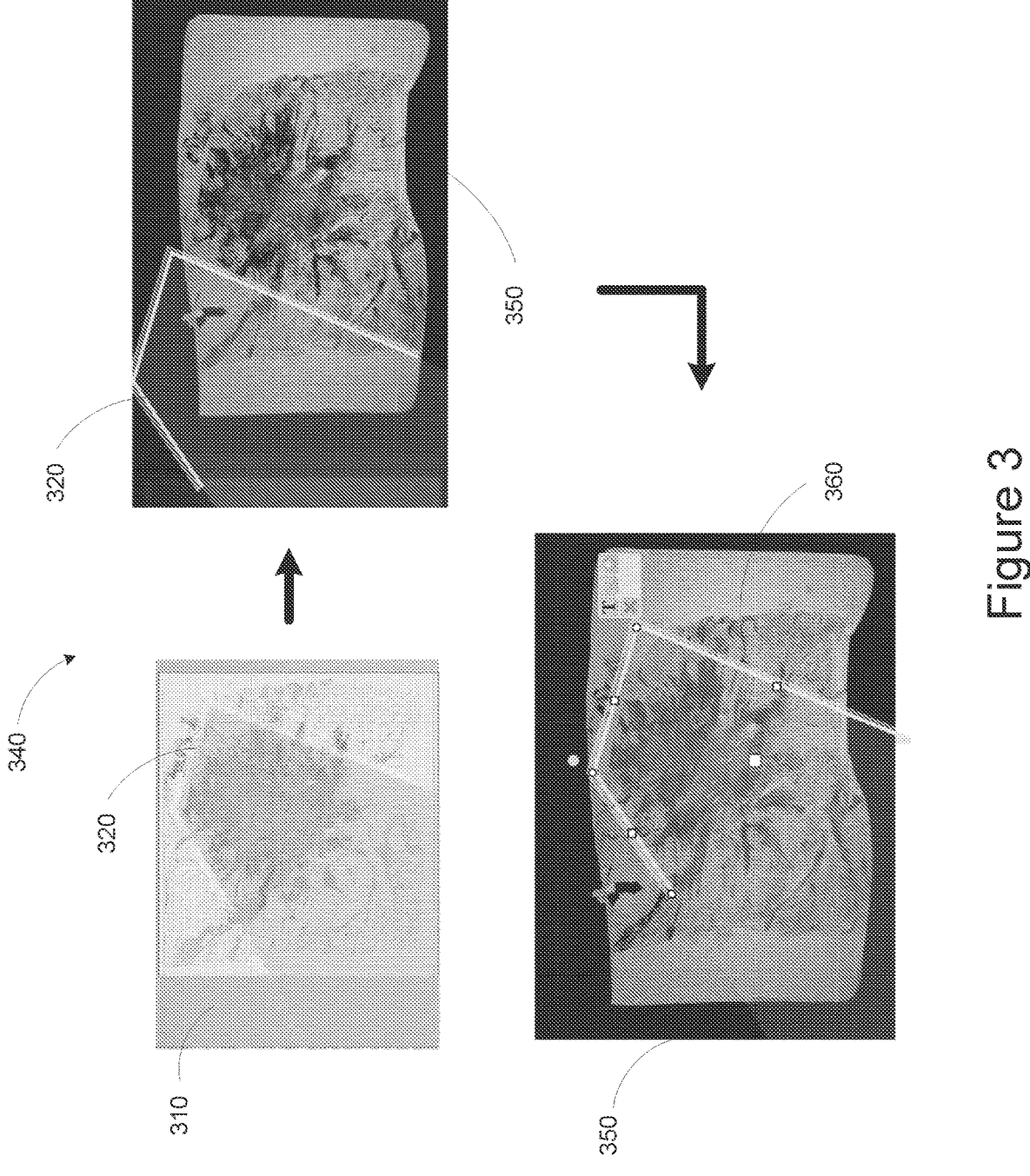
FIG. 3 illustrates an example embodiment of a system for transferring markings, according to various embodiments.
Figure 7:
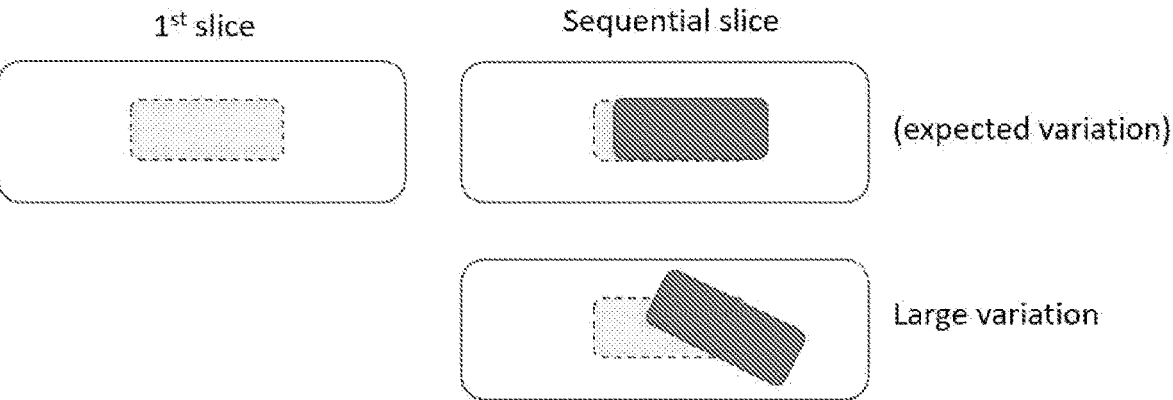
FIG. 7 illustrates an example of a situation wherein the variation between sequential tissue slides is too large, and an automated method of image registration would fail. As shown in the illustration, the first slice (shown in the left, light rectangle) would be expected to overlap with the sequential slice (dark rectangle) with a modest variation between slices. Such an expected variation is shown in the top right graphic. However, instances wherein a large variation between the first slice and the second slices occur would cause image registration failure using an algorithm-based method. In contrast, the methods described herein are advantageous in that such large variations between slices can be accounted for and properly handled to facilitate transfer or markings from one slide or an image thereof to a second slide or an image thereof.

FIG. 3 illustrates another example embodiment 340 of a system for transferring markings, according to various embodiments. In the illustrated embodiment 340 of FIG. 3, an image of a stained slide 310 is shown to have a digital marking 320 disposed thereon. The digital marking 320 is then copied from the image of the stained slide 310 and pasted on an image of an unstained slide 350. Once the digital marking 320 is pasted on the image of the unstained slide 350, it can be manipulated (e.g., position, orientate, pan, rotate, zoom, or mirror, etc.). After manipulation, the digital marking 320 is considered a transferred marking 360 on the image of the unstained slide 350. FIG. 3 also exemplifies an instance wherein a fully automated alignment (e.g. an algorithm-based alignment) would have failed to properly align two images. In this case, the digital marking 320 disposed thereon an image of a stained slide 310 would have been transferred to the image of the unstained slide 350 improperly if only relying on an algorithm-based alignment. This is shown in FIG. 3, top right image. However, when performed by an operator manually aligning the images based upon visual cues, digital transfer of the marking 360 on the image of the unstained slide 350 is far more accurate. This is shown in FIG. 3, bottom image. An additional instance wherein a fully automated alignment would have failed is exemplified in FIG. 7. As shown in the illustration, the first slice (shown in the left, light rectangle) would be expected to overlap with the sequential slice (dark rectangle) with a modest variation between slices. Such an expected variation is shown in the top right graphic. However, instances wherein a large variation between the first slice and the second slices occur, such as a large rotation of the slice coupled with a large translation of the slice, would cause image registration failure using an algorithm-based method. In contrast, the methods described herein are advantageous in that such large variations between slices can be accounted for by the operator based upon a visual inspection of sequential slides, and properly handled to facilitate transfer or markings from one slide or an image thereof to a second slide or an image thereof.

FIG. 4 is a flowchart for an example method S100 for transferring markings, according to various embodiments. The method S100 includes at step S102, projecting an image of a stained slide with pathologist markings onto a display; at step S104, placing an unstained slide on a scaffold that lies on top of the display; at step S106, aligning the unstained slide with the projected image of the stained slide by moving the scaffold; and at step S108, physically transferring the pathologist markings onto the unstained slide. Step S106 is performed manually by an operator, based upon visual cues in the stained slide and the unstained slide.

In various embodiments, the stained slide further comprises one or more pre-markings. In various embodiments, the one or more pre-markings is used as a guideline in the physically transferring of the pathologist markings onto the unstained slide. In various embodiments, physically transferring of the pathologist markings onto the unstained slide includes drawing one or more features or markings on the unstained slide. In various embodiments, one or more features includes one or more dots, straight or curve lines, or a polyline. In various embodiments, the projected image of the stained slide is panned, rotated, zoomed, or overlaid to aid in the aligning with the unstained slide. In various embodiments, the projected image of the stained slide is flipped to aid in the aligning with the unstained slide. In some embodiments, such movements (panning, rotating, zooming, overlaying, flipping, etc.) are performed manually by an operator, rather than performed using a fully automated algorithm.

In various embodiments, the method S100 can include, optionally at step S110, recognizing, via an application, the pathologist markings; optionally at step S112, converting the pathologist markings into one or more features; and optionally at step S114, transferring the one or more features onto the unstained slide.

In various embodiments, a low-resolution image of the stained slide is used in the recognizing of the pathologist markings and in the converting the pathologist markings into the one or more features. In various embodiments, one or more boundary edges or corners of the low-resolution image is used in the recognizing and in the converting of the pathologist markings into the one or more features. In various embodiments, projecting the image of the stained slide onto the display occurs from behind, above, or a side of the stained slide. In various embodiments, the transferred pathologist markings are used for scraping a portion of a biological specimen. In various embodiments, the stained slide comprises hematoxylin and eosin stained slide or immunohistochemistry stained slide.

Figure 5:
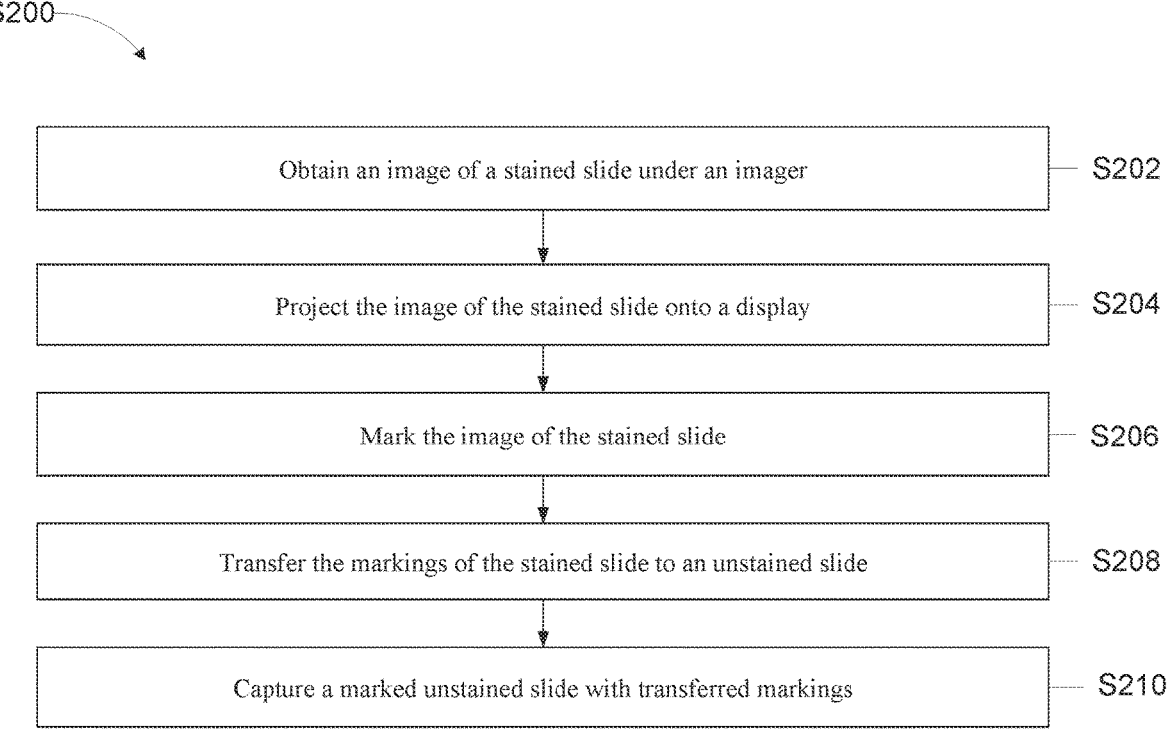
FIG. 5 is a flowchart for an example method for transferring markings, according to various embodiments.

FIG. 5 is a flowchart for an example method S200 for transferring markings, according to various embodiments. The method S200 includes at step S202, obtaining an image of a stained slide under an imager; at step S204, projecting the image of the stained slide onto a display; at step S206, marking the image of the stained slide; at step S208, transferring the markings of the stained slide to an unstained slide; and at step S210, capturing a marked unstained slide with transferred markings.

In various embodiments, the stained slide comprises one or more pre-markings. In various embodiments, marking the image of the stained slide comprises using the one or more pre-markings as a reference guideline. In various embodiments, marking the image of the stained slide comprises drawing one or more features on the display. In various embodiments, marking the image of the stained slide comprises drawing one or more dots, straight or curve lines, or a polyline on the display; recognizing, via an application, the one or more drawn dots or lines, or the drawn polyline; and converting the one or more recognized dots or lines, or the recognized polyline into one or more digital features.

In various embodiments, the image of the stained slide is a low-resolution image of the stained slide and wherein the low-resolution image is used in the recognizing and in the converting of the one or more dots or lines, or the polyline into the one or more digital features. In various embodiments, one or more boundary edges or corners of the low-resolution image is used in the recognizing and in the converting of the one or more dots or lines, or the polyline into the one or more features.

In some embodiments, the transferring of the markings of the stained slide to the unstained slide comprises overlaying the unstained slide on top of the stained slide; re-orienting the unstained slide to align and superimpose the one or more digital features onto the unstained slide; and marking the unstained slide. In some embodiments, the unstained slide is overlaid on top of the stained slide and re-oriented to align and superimpose the one or more features manually (e.g. by an operator). In various embodiments, the transferring of the markings of the stained slide to the unstained slide comprises overlaying the unstained slide on top of the stained slide with markings; re-orienting the unstained slide to align and superimpose the one or more digital features of the markings of the stained slide onto the unstained slide; and marking the unstained slide with markings of physical tissue features of the stained slide. In some embodiments, the unstained slide is overlaid on top of the stained slide and re-oriented to align and superimpose the one or more features manually (e.g. by an operator).

In various embodiments, an image of the unstained slide is used in place of the unstained slide during the transferring of the markings of the stained slide to the unstained slide. In some embodiments, the image of the unstained slide is aligned with the stained slide or an image of the stained slide manually. In various embodiments, the transferring of the markings of the stained slide to the unstained slide comprises: copying markings of the stained slide; and pasting the copied markings of the stained slide onto the unstained slide.

In various embodiments, the image of the unstained slide is slightly transparent to allow simultaneous viewing of the image of the stained slide and the image of the unstained slide during the transferring of the markings of the stained slide to the unstained slide. In various embodiments, the re-orienting of the image of the unstained slide further comprises zooming in or out simultaneously of the image of the stained slide and the image of the unstained slide by a same amount. In various embodiments, the re-orienting of the image of the unstained slide further comprises performing one or more operations of a pan, a rotate, a zoom, or a mirror image of the image of the unstained slide. In various embodiments, the re-orienting of the image of the unstained slide further comprises an overlay of the image of the unstained slide against the image of the stained slide. Any of these movements (e.g. zooming in or out, panning, rotating, zooming, or mirroring) may be performed by an operator, including by an operator using the assistance of a first application (e.g. a software). In some embodiments, these movements are decided by the operator based upon visual cues. This is in contrast to performing alignments using a fully automated method, such an algorithm, which may rely on a pixel-by-pixel analysis in order to determine the proper movements to attempt to align the slides/images of the slides.

In various embodiments, the method S200 can optionally include (not shown) panning the image of the stained slide and the image of the unstained slide; storing transformation coordinates of the panning; and associating the transformation coordinates of the panning with the unstained slide. In various embodiments, the method S200 can optionally include (not shown) rotating the image of the stained slide and the image of the unstained slide; storing transformation coordinates of the rotating; and associating the transformation coordinates of the rotating with the unstained slide.

In various embodiments, the method S200 can optionally include (not shown) marking a first region ("S") and a second region ("X") on the marked unstained slide; and saving an image of the unstained slide with superimposed marking image coordinates and markings of the first region and the second region. In various embodiments, the method S200 can optionally include (not shown) associating the saved superimposed marking image coordinates and markings of the first region and the second region of the image of the unstained slide with the unstained slide.

In various embodiments, the transferring of the markings can be repeated as needed for additional unstained slides. In various embodiments, the systems and methods disclosed herein can be used for marking multiple tissue samples on a slide. In some embodiments, the systems and methods disclosed herein can be used for marking multiple droplets of a liquid biopsy sample on a slide. In various embodiments, an operator or a physician can remotely mark stained slides and/or transfer digitized stained image to a lab to process the unstained slides. In various embodiments, the lab can transfer digitized stained slide back to submitting physician, or vice versa. In various embodiments, the disclosed systems and methods allow for digitally stitching together images for slides with broken microscopic glass. In various embodiments, the disclosed systems and methods can process tissues of varying size. In various embodiments, there is no constraint on the size of the tissue samples. In various embodiments, the disclosed systems and methods can allow for overlaying slides of varying staining types and processing of different regions differently. In various embodiments, the disclosed systems and methods can keep track of the stained marking and the transformation matrix to the unstained image.

Figure 6:
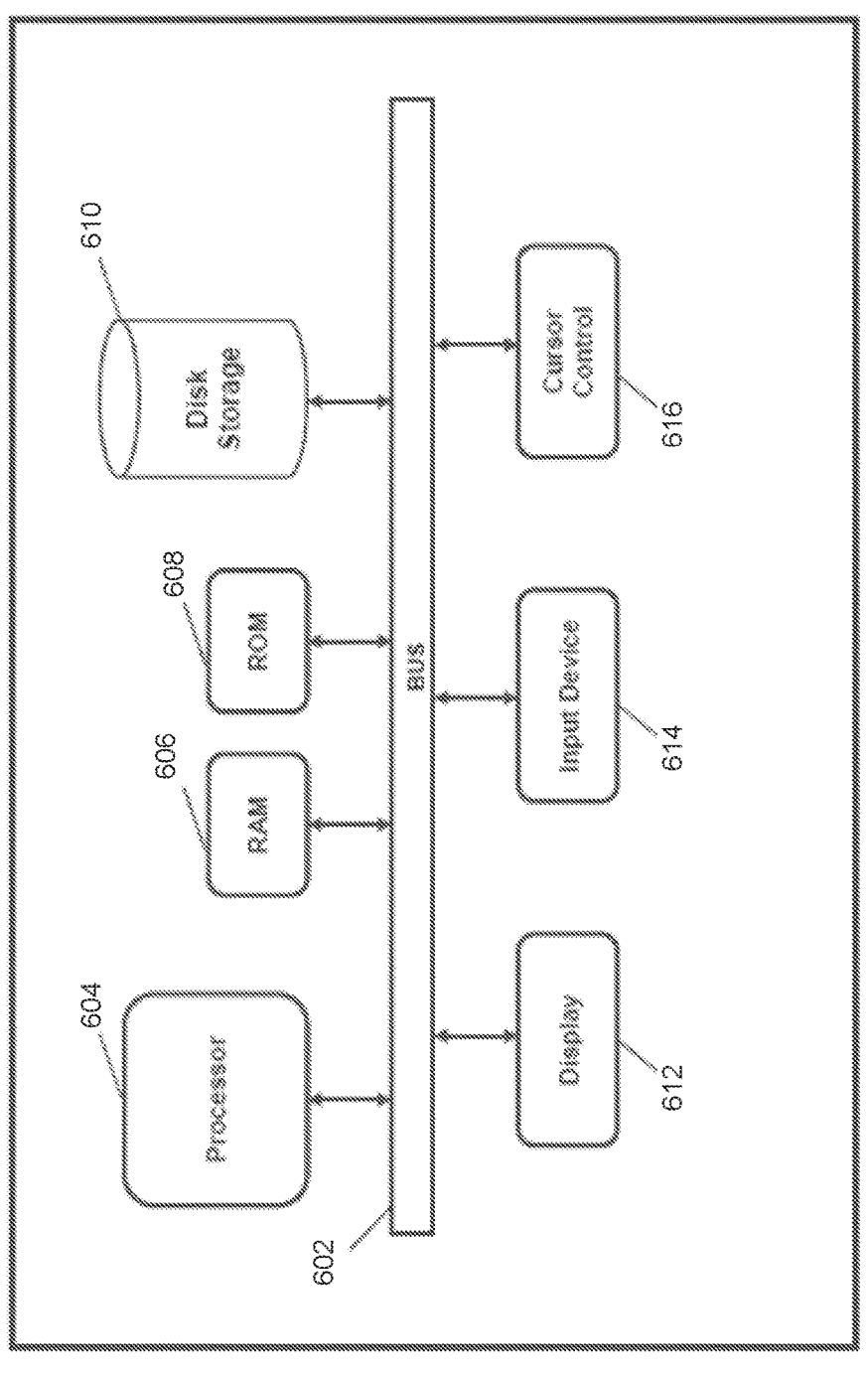
FIG. 6 is a block diagram that illustrates a computer system, according to various embodiments.

FIG. 6 is a block diagram that illustrates a computer system 600, upon which embodiments of the present teachings may be implemented. In various embodiments of the present teachings, computer system 600 can include a bus 602, or other communication mechanism for communicating information, and a processor 604 coupled with bus 602 for processing information. In various embodiments, computer system 600 can also include a memory, which can be a random-access memory (RAM) 606, or other dynamic storage device, coupled to bus 602 for determining instructions to be executed by processor 604. Memory also can be used for storing temporary variables or other intermediate information during execution of instructions to be executed by processor 604. In various embodiments, computer system 600 can further include a read only memory (ROM) 608 or other static storage device coupled to bus 602 for storing static information and instructions for processor 604. A storage device 610, such as a magnetic disk or optical disk, can be provided and coupled to bus 602 for storing information and instructions.

In various embodiments, computer system 600 can be coupled via bus 602 to a display 612, such as, for example, a cathode ray tube (CRT), a liquid crystal display (LCD) or a light emitting diode (LED) display, for displaying information to a computer user. An input device 614, including alphanumeric and other keys, can be coupled to bus 602 for communicating information and command selections to processor 604. Another type of user input device is a cursor control 616, such as a mouse, a trackball or cursor direction keys for communicating direction information and command selections to processor 604 and for controlling cursor movement on display 612. This input device 614 typically has two degrees of freedom in two axes, a first axis (i.e., x) and a second axis (i.e., y), that allows the device to specify positions in a plane. However, it should be understood that input devices 614 allowing for 3-dimensional (x, y and z) cursor movement are also contemplated herein.

Consistent with certain implementations of the present teachings, results can be provided by computer system 600 in response to processor 604 executing one or more sequences of one or more instructions contained in memory 606. Such instructions can be read into memory 606 from another computer-readable medium or computer-readable storage medium, such as storage device 610. Execution of the sequences of instructions contained in memory 606 can cause processor 604 to perform the processes described herein. Alternatively, hard-wired circuitry can be used in place of or in combination with software instructions to implement the present teachings. Thus, implementations of the present teachings are not limited to any specific combination of hardware circuitry and software.

The term "computer-readable medium" (e.g., data store, data storage, etc.) or "computer-readable storage medium" as used herein refers to any media that participates in providing instructions to processor 604 for execution. Such a medium can take many forms, including but not limited to, non-volatile media, volatile media, and transmission media. Examples of non-volatile media can include, but are not limited to, optical, solid state, magnetic disks, such as storage device 610. Examples of volatile media can include, but are not limited to, dynamic memory, such as memory 606. Examples of transmission media can include, but are not limited to, coaxial cables, copper wire, and fiber optics, including the wires that comprise bus 602.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, or any other tangible medium from which a computer can read.

In addition to computer readable medium, instructions or data can be provided as signals on transmission media included in a communications apparatus or system to provide sequences of one or more instructions to processor 604 of computer system 600 for execution. For example, a communication apparatus may include a transceiver having signals indicative of instructions and data. The instructions and data are configured to cause one or more processors to implement the functions outlined in the disclosure herein. Representative examples of data communications transmission connections can include, but are not limited to, telephone modem connections, wide area networks (WAN), local area networks (LAN), infrared data connections, NFC connections, etc.

It should be appreciated that the methodologies described herein flow charts, diagrams and accompanying disclosure can be implemented using computer system 600 as a stand-alone device or on a distributed network of shared computer processing resources such as a cloud computing network.

The methodologies described herein may be implemented by various means depending upon the application. For example, these methodologies may be implemented at least in part in hardware, firmware, software, or any combination thereof. For a hardware implementation, the processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

In various embodiments, the methods of the present teachings may be implemented at least in part as firmware and/or a software program and applications written in conventional programming languages such as C, C++, Python, etc. If implemented as firmware and/or software, the embodiments described herein can be implemented on a non-transitory computer-readable medium in which a program is stored for causing a computer to perform the methods described above. It should be understood that the various engines described herein can be provided on a computer system, such as computer system 600 of FIG. 6, whereby processor 604 would execute the analyses and determinations provided by these engines, subject to instructions provided by any one of, or a combination of, memory components 606/608/610 and user input provided via input device 614.

In accordance with various embodiments, a non-transitory computer-readable medium in which a program is stored for causing a computer to perform a method for transferring markings is provided. In accordance with various embodiments, the method includes obtaining an image of a stained slide under an imager; projecting the image of the stained slide onto a display; marking the image of the stained slide, including digitally marking one or more features and transferring the digital marking of the one or more features into coordinates; and capturing a marked unstained slide with transferred markings.

Recitation of Embodiments

Embodiment 1. A system for transferring pathologist markings, comprising:
    an imaging device configured for imaging a stained slide and an unstained slide;
    a display for displaying one or more images of the stained slide and the unstained slide;
    a first application used in aligning the one or more images of the stained slide or unstained slide; and
    a second application used in transferring a digital marking of one or more features.

Embodiment 2. The system of Embodiment 1, wherein the second application is used in transferring the digital marking of the one or more features from an image of the stained slide to an image of the unstained slide.

Embodiment 3. The system of Embodiment 1, wherein the second application is used in transferring the digital marking of the one or more features into coordinates for use in further processing.

Embodiment 4. The system of any one of the preceding Embodiments, wherein aligning the one or more images is performed manually based on visual cues.

Embodiment 5. The system of Embodiment 1 or Embodiment 2, wherein the imaging device is an electronic microscope.

Embodiment 6. The system of any one of the preceding Embodiments, wherein the stained slide comprises a hematoxylin and eosin stained slide, a slide containing a specimen evaluated by one or more light scattering properties, or an immunohistochemistry stained slide.

Embodiment 7. The system of any one of any one of Embodiments 3-6, wherein further processing comprises one or more downstream processes that include at least a dissection or separation of a portion of a biological specimen.

Embodiment 8. The system of any one of the preceding Embodiments, wherein the first application is a metrology software program used for inspection of physical properties of the stained slide or the unstained slide.

Embodiment 9. The system of any one of the preceding Embodiments, wherein the second application is a marking software program used in digitally marking the one or more features.

Embodiment 10. The system of any one of the preceding Embodiments, wherein the aligning of the one or more images comprises positioning and/or orienting the one or more images of the stained slide or unstained slide, wherein the positioning and/or orienting of the one or more images is performed manually by an operator.

Embodiment 11. The system of Embodiment 10, wherein the orienting of the one or more images of the stained slide or unstained slide comprises one or more operations of a pan, a rotate, a zoom, or a mirror image of the one or more images of the stained slide or unstained slide.

Embodiment 12. The system of Embodiment 10, wherein the one or more images of the stained slide or unstained slide are overlaid on one another to obtain an alignment of the one or more images of the stained slide or unstained slide.

Embodiment 13. The system of any one of the preceding Embodiments, wherein the one or more features comprises one or more dots, straight or curve lines, or a polyline.

Embodiment 14. The system of Embodiment 13, wherein the one or more features are drawn manually by an operator.

Embodiment 15. The system of Embodiment 13 or Embodiment 14, wherein the second application is used in recognizing the one or more dots or lines, or the polyline, and converting the one or more dots or lines, or the polyline into the digital marking of the one or more features.

Embodiment 16. The system of Embodiments 15, wherein the one or more images of the stained slide comprises a low-resolution image of the stained slide.

Embodiment 17. The system of Embodiment 16, wherein one or more boundary edges or corners of the low-resolution image is used in the recognizing and in the converting of the one or more dots or lines, or the polyline into the digital marking of the one or more features.

Embodiment 18. A method for digitally transferring markings, comprising:

obtaining an image of a stained slide under an imager;

displaying the image of the stained slide onto a display;

transferring markings of the stained slide to an unstained slide; and capturing a marked unstained slide with transferred markings.

Embodiment 19. The method of Embodiment 18, further comprising marking the image of the stained slide prior to transferring the markings of the stained slide to an unstained slide.

Embodiment 20. The method of Embodiment 18 or Embodiment 19, wherein the stained slide comprises one or more pre-markings.

Embodiment 21. The method of Embodiment 20, wherein marking the image of the stained slide comprises using the one or more pre-markings as a reference guideline.

Embodiment 22. The method of any one of Embodiments 18-21, wherein marking the image of the stained slide comprises drawing one or more features on the display.

Embodiment 23. The method of any one of Embodiments 18-23, wherein marking the image of the stained slide comprises:

drawing one or more dots, straight or curve lines, or a polyline on the display;

recognizing, via an application, the one or more drawn dots or lines, or the drawn polyline; and converting the one or more recognized dots or lines, or the recognized polyline into one or more digital features.

Embodiment 24. The method of Embodiment 23, wherein the image of the stained slide is a low-resolution image of the stained slide and wherein the low-resolution image is used in the recognizing and in the converting of the one or more dots or lines, or the polyline into the one or more digital features.

Embodiment 25. The method of Embodiment 24, wherein one or more boundary edges or corners of the low-resolution image is used in the recognizing and in the converting of the one or more dots or lines, or the polyline into the one or more digital features.

Embodiment 26. The method of any one of Embodiments 23-25, wherein the transferring of the markings of the stained slide to the unstained slide comprises:

overlaying the unstained slide on top of the image of the stained slide with markings;

re-orienting the unstained slide to align and superimpose the one or more digital features of the markings on the image of the stained slide onto the unstained slide; and marking the unstained slide with markings of physical tissue features of the stained slide.

Embodiment 27. The method of Embodiment 26, wherein overlaying the unstained slide on top of the image of the stained slide and/or re-orienting the unstained slide is performed manually by an operator.

Embodiment 28. The method of Embodiment 26 or Embodiment 27, wherein an image of the unstained slide is used in place of the unstained slide during the transferring of the markings of the stained slide to the unstained slide.

Embodiment 29. The method of any one of Embodiments 18-25, wherein the transferring of the markings of the stained slide to the unstained slide comprises: copying markings of the stained slide; and pasting the copied markings of the stained slide onto the unstained slide.

Embodiment 30. The method of Embodiment 29, wherein an image of the unstained slide is used in place of the unstained slide during the transferring of the markings of the stained slide to the unstained slide.

Embodiment 31. The method of Embodiment 30, wherein the image of the unstained slide is slightly transparent to allow simultaneous viewing of the image of the stained slide and the image of the unstained slide during the transferring of the markings of the stained slide to the unstained slide.

Embodiment 32. The method of Embodiment 30 or 31, wherein the re-orienting of the image of the unstained slide further comprises zooming in or out simultaneously of the image of the stained slide and the image of the unstained slide by a same amount.

Embodiment 33. The method of Embodiment 30 or 31, wherein the re-orienting of the image of the unstained slide further comprises performing one or more operations of a pan, a rotate, a zoom, or a mirror image of the image of the unstained slide.

Embodiment 34. The method of Embodiment 30, wherein the re-orienting of the image of the unstained slide further comprises performing an overlay of the image of the unstained slide against the image of the stained slide.

Embodiment 35. The method of Embodiment 30, further comprising:

panning the image of the stained slide and the image of the unstained slide;

storing transformation coordinates of the panning; and associating the transformation coordinates of the panning with the unstained slide.

Embodiment 36. The method of Embodiment 30, further comprising:

rotating the image of the stained slide and the image of the unstained slide;

storing transformation coordinates of the rotating; and associating the transformation coordinates of the rotating with the unstained slide.

Embodiment 37. The method of any one of Embodiments 18-36, further comprising:

marking a first region ("S") and a second region ("X") on the marked unstained slide; and saving an image of the unstained slide with superimposed marking image coordinates and markings of the first region and the second region.

Embodiment 38. The method of Embodiment 37, further comprising:

associating the saved superimposed marking image coordinates and markings of the first region and the second region of the image of the unstained slide with the unstained slide.

Embodiment 39. A system for transferring pathologist markings, comprising:

an imaging device configured for imaging a stained slide or an unstained slide;

a display for displaying one or more images of the stained slide or the unstained slide;

a mechanical stage/scaffold for positioning or orienting the stained slide with respect to the unstained slide to enable physical marking of the unstained slide; and an application used to digitally draw one or more features based on the physical marking and transfer the physical marking into coordinates to be used for further processing.

Embodiment 40. The system of Embodiment 39, wherein the mechanical stage/scaffold is operated manually to position or orient the stained slide with respect to the unstained slide.

Embodiment 41. The system of Embodiment 39 or 40, wherein the imaging device is an electronic microscope.

Embodiment 42. The system of any one of Embodiments 39-41, wherein the application is a metrology software program used for inspection of physical properties of the stained slide or the unstained slide.

Embodiment 43. The system of any one of Embodiments 39-42, wherein the stained slide comprises a hematoxylin and eosin stained slide, a slide containing a specimen evaluated by one or more light scattering properties, or an immunohistochemistry stained slide.

Embodiment 44. The system of any one of Embodiments 39-43, wherein further processing comprises one or more downstream processes that include at least a dissection or separation of a portion of a biological specimen.

Embodiment 45. The system of any one of Embodiments 39-44, wherein the one or more features comprises one or more dots, straight or curve lines, or a polyline.

Embodiment 46. The system of any one of Embodiments 39-45, wherein the stained slide further comprises one or more pre-markings.

Embodiment 47. The system of Embodiment 46, wherein the one or more pre-markings is used as a guideline in the transfer of physical markings onto the unstained slide.

Embodiment 48. The system of any one of Embodiments 39-47, wherein the application is used in recognizing the physical markings and for converting the physical markings into the one or more features.

Embodiment 49. The system of Embodiment 48, wherein the one or more images of the stained slide comprises a low-resolution image and the low-resolution image is used in recognizing of the physical markings and for converting the physical markings into the one or more features.

Embodiment 50. The system of Embodiment 49, wherein one or more boundary edges or corners of the low-resolution image is used in the recognizing and in the converting of the physical markings into the one or more features.

Embodiment 51. A method for transferring markings, comprising:

projecting an image of a stained slide with pathologist markings onto a display;

placing an unstained slide on a scaffold that lies on top of the display;

aligning the unstained slide with the projected image of the stained slide by positioning the scaffold; and physically transferring the pathologist markings onto the unstained slide.

Embodiment 52. The method of Embodiment 51, wherein the scaffold is positioned manually by an operator.

Embodiment 53. The method of Embodiment 51 or 52, wherein the stained slide further comprises one or more pre-markings.

Embodiment 54. The method of Embodiment 53, wherein the one or more pre-markings is used as a guideline in the physically transferring of the pathologist markings onto the unstained slide.

Embodiment 55. The method of any one of Embodiments 51-54, wherein physically transferring of the pathologist markings onto the unstained slide comprises drawing one or more features or markings on the unstained slide.

Embodiment 56. The method of Embodiment 55, wherein the one or more features comprises one or more dots, straight or curve lines, or a polyline.

Embodiment 57. The method of any one of Embodiments 51-56, wherein the projected image of the stained slide is panned, rotated, zoomed, and/or overlaid to aid in the aligning with the unstained slide.

Embodiment 58. The method of any one of Embodiments 51-57, wherein the projected image of the stained slide is flipped to aid in the aligning with the unstained slide.

Embodiment 59. The method of Embodiment 57 or 58, wherein the projected image of the stained slide is panned, rotated, zoomed, overlaid, and/or flipped manually by an operator.

Embodiment 60. The method of any one of Embodiments 51-60, further comprising:

recognizing, via an application, the pathologist markings;

converting the pathologist markings into one or more features; and transferring the one or more features onto the unstained slide.

Embodiment 61. The method of Embodiment 60, wherein a low-resolution image of the stained slide is used in the recognizing of the pathologist markings and in the converting the pathologist markings into the one or more features.

Embodiment 62. The method of Embodiment 23, wherein one or more boundary edges or corners of the low-resolution image is used in the recognizing and in the converting of the pathologist markings into the one or more features.

Embodiment 63. The method of any one of Embodiments 51-62, wherein projecting the image of the stained slide onto the display occurs from behind, above, or a side of the stained slide.

Embodiment 64. The method of any one of Embodiments 51-63, wherein the transferred pathologist markings are used for scraping a portion of a biological specimen.

Embodiment 65. The method of any one of Embodiments 51-64, wherein the stained slide comprises a hematoxylin and eosin stained slide, a slide containing a specimen evaluated by one or more light scattering properties, or an immunohistochemistry stained slide.

While this specification contains many specific implementation details, these should not be construed as limitations on the scope of any disclosure or of what may be claimed, but rather as descriptions of features specific to particular implementations of particular embodiments. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A system for transferring pathologist markings, comprising:

an imaging device for imaging a stained slide and an unstained slide;

a display for displaying one or more images of the stained slide and the unstained slide;

a first application used in aligning the one or more images of the stained slide or the unstained slide, wherein said aligning comprises positioning and/or orienting the one or more images of the stained slide or the unstained slide, and wherein said aligning the one or more images is performed manually by an operator based on visual cues in the one or more images, without using image registration algorithms; and a second application used in transferring a digital marking of one or more features.

2. The system of claim 1, wherein the second application is used in transferring the digital marking of the one or more features from an image of the stained slide to an image of the unstained slide.

3. The system of claim 1, wherein the second application is used in transferring the digital marking of the one or more features into coordinates for use in further processing.

4. The system of claim 3, wherein further processing comprises one or more downstream processes that include at least a dissection or separation of a portion of a biological specimen.

5. The system of claim 1, wherein the first application is a metrology software program used for inspection of physical properties of the stained slide or the unstained slide, and/or wherein the second application is a marking software program used in digitally marking the one or more features.

6. The system of claim 1, wherein the orienting of the one or more images of the stained slide or the unstained slide comprises one or more operations of a pan, a rotate, a zoom, or a mirror image of the one or more images of the stained slide or the unstained slide, or wherein the one or more images of the stained slide or the unstained slide are overlaid on one another to obtain an alignment of the one or more images of the stained slide or the unstained slide.

7. The system of claim 1, wherein the one or more features comprises one or more dots, straight or curve lines, or a polyline, and wherein the second application is used in recognizing the one or more dots or lines, or the polyline, and converting the one or more dots or lines, or the polyline into the digital marking of the one or more features.

8. The system of claim 7, wherein the one or more features are drawn manually by an operator.

9. The system of claim 7, wherein the one or more images of the stained slide comprises a low-resolution image of the stained slide.

10. The system of claim 9, wherein one or more boundary edges or corners of the low-resolution image is used in the recognizing and in the converting of the one or more dots or lines, or the polyline into the digital marking of the one or more features.

11. A method for digitally transferring markings, comprising:

obtaining an image of a stained slide under an imager;

displaying the image of the stained slide onto a display;

aligning the image of the stained slide with an unstained slide, wherein the aligning is performed manually based on visual cues in the image of the stained slide and/or in the unstained slide, without using image registration algorithms; and transferring one or more markings from the image of the stained slide to the unstained slide.

12. The method of claim 11, comprising marking the image of the stained slide prior to transferring the one or more markings, wherein marking the image of the stained slide comprises drawing one or more features on the display.

13. The method of claim 12, wherein marking the image of the stained slide comprises:

drawing one or more dots, straight or curve lines, or a polyline on the display;

recognizing, via an application, the one or more drawn dots or lines, or the drawn polyline; and converting the one or more recognized dots or lines, or the recognized polyline into one or more digital markings.

14. The method of claim 13, wherein the image of the stained slide is a low-resolution image of the stained slide and wherein one or more boundary edges or corners of the low-resolution image is used in the recognizing and in the converting of the one or more dots or lines, or the polyline into the one or more digital markings.

15. The method of claim 11, comprising:

overlaying the unstained slide on top of the image of the stained slide with the one or more digital markings;

re-orienting the unstained slide to align and superimpose the one or more digital markings onto the unstained slide; and marking the unstained slide, wherein overlaying the unstained slide on top of the image of the stained slide and/or re-orienting the unstained slide is performed manually by an operator based on visual cues in the image of the stained slide and/or in the unstained slide without using image registration algorithms.

16. The method of claim 15, wherein the re-orienting comprises placing the unstained slide on a scaffold that lies on top of the display and aligning the unstained slide with the image of the stained slide by positioning the scaffold, wherein the scaffold is operated manually by the operator.

17. A system for transferring pathologist markings, comprising:

an imaging device for imaging a stained slide or an unstained slide;

a display for displaying one or more images of the stained slide or the unstained slide;

a mechanical stage/scaffold for positioning or orienting the stained slide with respect to the unstained slide to enable physical marking of the unstained slide, wherein the mechanical stage/scaffold is operated manually to position or orient the stained slide with respect to the unstained slide based on visual cues in the stained slide and/or in the unstained slide, without using image registration algorithms; and an application used to digitally draw one or more features based on the physical marking and transfer the features into coordinates to be used for further processing.

18. The system of claim 17, wherein the application is a metrology software program used for inspection of physical properties of the stained slide or the unstained slide.

19. The system of claim 17, wherein further processing comprises one or more downstream processes that include at least a dissection or separation of a portion of a biological specimen.

* * * * *